(12) United States Patent
Shami

(10) Patent No.: US 11,963,604 B2
(45) Date of Patent: Apr. 23, 2024

(54) METHOD AND APPARATUS FOR ANALYZING AND TREATING HAIR

(71) Applicant: LG Farouk Co., Gangnam-gu (KR)

(72) Inventor: Farouk M. Shami, Houston, TX (US)

(73) Assignee: LG Farouk Co., Gangnam-gu (KR)

( * ) Notice: Subject to any disclaimer, the term of this patent is extended or adjusted under 35 U.S.C. 154(b) by 0 days.

(21) Appl. No.: 18/092,754

(22) Filed: Jan. 3, 2023

(65) Prior Publication Data
US 2023/0136185 A1 May 4, 2023

Related U.S. Application Data

(63) Continuation of application No. 15/805,884, filed on Nov. 7, 2017, now abandoned, which is a continuation-in-part of application No. 15/347,344, filed on Nov. 9, 2016, now abandoned.

(51) Int. Cl.
| | |
|---|---|
| *A45D 44/00* | (2006.01) |
| *A45D 19/00* | (2006.01) |
| *B01F 33/84* | (2022.01) |
| *B01F 33/841* | (2022.01) |
| *G01N 21/25* | (2006.01) |
| *B01F 101/30* | (2022.01) |
| *G01N 21/31* | (2006.01) |

(52) U.S. Cl.
CPC ........... *A45D 44/005* (2013.01); *A45D 19/00* (2013.01); *B01F 33/841* (2022.01); *B01F 33/844* (2022.01); *B01F 33/8442* (2022.01); *B01F 33/846* (2022.01); *G01N 21/251* (2013.01); *G01N 21/255* (2013.01); *A45D 19/0066* (2021.01); *A45D 2044/007* (2013.01); *A45D 2200/054* (2013.01); *A45D 2200/058* (2013.01); *B01F 2101/30* (2022.01); *G01N 21/31* (2013.01)

(58) Field of Classification Search
CPC ............ A45D 44/005; A45D 2044/007; A45D 2200/058; G05D 11/132; B01F 13/1061; B01F 13/1066; B01F 33/8442; B01F 33/841; B05C 11/11; B05C 11/1036; B05C 11/1015
USPC ............................ 222/1, 144, 129, 145.5, 52
See application file for complete search history.

(56) References Cited

U.S. PATENT DOCUMENTS

| | | | | |
|---|---|---|---|---|
| 888,464 | A * | 5/1908 | Burri | B01F 33/84 |
| | | | | 222/135 |
| 3,015,415 | A * | 1/1962 | Marsh | G05D 11/001 |
| | | | | 222/14 |
| 5,938,080 | A * | 8/1999 | Haaser | B01F 35/8822 |
| | | | | 222/144.5 |
| 6,089,408 | A * | 7/2000 | Fox | A45D 19/02 |
| | | | | 222/144 |
| 8,830,467 | B2 * | 9/2014 | Igarashi | B01F 33/84 |
| | | | | 356/402 |
| 8,960,994 | B2 * | 2/2015 | Schwartz | A45D 44/005 |
| | | | | 366/140 |
| 9,145,884 | B2 * | 9/2015 | Solera | F04B 9/04 |
| 9,205,283 | B2 * | 12/2015 | Miklatzky | A61K 8/415 |

(Continued)

*Primary Examiner* — Charles P. Cheyney
(74) *Attorney, Agent, or Firm* — Blank Rome LLP

(57) ABSTRACT

An apparatus includes a housing, a dispensing system disposed in the housing, a spectral measurement device, and a computing system. The computing system includes a control mechanism operatively connected to the dispensing system, the spectral measurement device, a processor, a storage device, an input, and a display.

20 Claims, 12 Drawing Sheets

(56) References Cited

U.S. PATENT DOCUMENTS

| | | | | |
|---|---|---|---|---|
| 9,254,928 B2* | 2/2016 | Fukuda | ............... | G16H 20/17 |
| 10,232,330 B2* | 3/2019 | Macedo | ............... | B01F 33/841 |
| 10,549,247 B2* | 2/2020 | Schwartz | ............... | A45D 34/00 |
| 2003/0230355 A1* | 12/2003 | Bartholomew | ............... | A45D 44/00 |
| | | | | 141/104 |
| 2007/0084520 A1* | 4/2007 | Driessen | ............... | B01F 35/881 |
| | | | | 141/2 |
| 2012/0248147 A1* | 10/2012 | Krom | ............... | B01F 35/881 |
| | | | | 222/105 |
| 2015/0021356 A1* | 1/2015 | Witchell | ............... | B01F 33/848 |
| | | | | 222/23 |
| 2015/0231582 A1* | 8/2015 | Schwartz | ............... | B01F 35/7174 |
| | | | | 366/142 |
| 2016/0107133 A1* | 4/2016 | Sugino | ............... | G01N 21/25 |
| | | | | 366/142 |
| 2018/0126346 A1* | 5/2018 | Post | ............... | B01F 35/56 |
| 2023/0232964 A1* | 7/2023 | Gimenez | ............... | A45D 44/005 |
| | | | | 141/9 |

* cited by examiner

METHOD AND APPARATUS FOR ANALYZING AND TREATING HAIR

CROSS REFERENCE TO RELATED APPLICATIONS

This application is a continuation of U.S. patent application Ser. No. 15/805,884, filed Nov. 7, 2017, which is a continuation-in-part of U.S. patent application Ser. No. 15/347,344, filed Nov. 9, 2016, the entire disclosures of which are hereby incorporated by reference herein.

BACKGROUND

Currently, hair may be dyed by selecting a premixed hair dye, such a hair dye provided by retail. When a user wants a particular hair color not provided premixed and ready to apply, the user may work with a stylist to achieve the particular hair color. The stylist may manually mix different dye ingredients to develop a dye color that may achieve the particular hair color. In some cases, a machine may be used to mix the different dye ingredients.

Hair dye may be mixed by combining various amounts of three primary colors (blue, red and yellow) and white and black. Other dye ingredients may include, for example, an oxidizing liquid, developers, emulsifiers, stabilizers and surfactants.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to an apparatus that includes a housing, a dispensing system disposed in the housing, a spectral measurement device, and a computing system. The dispensing system may include at least one storage container, a pump operatively connected to each of the storage containers, and a mixing chamber. The computing system may include a control mechanism operatively connected to the pump and the spectral measurement device, a processor, a storage device, an input, and a display.

In another aspect, embodiments of the present disclosure relate to methods that include collecting hair data from a hair sample, the hair data selected from the group consisting of chemical composition, moisture content, porosity, and density, selecting a hair dye color, providing a formula of amounts of dye ingredients for a hair dye that colors the hair sample the selected hair dye color, and dispensing the amounts of dye ingredients to produce the hair dye.

In yet another aspect, embodiments of the present disclosure relate to methods that include collecting hair data from a hair sample using a spectral measurement device, selecting a hair dye color, and providing a hair dye that colors the hair sample the selected hair dye color.

Other aspects and advantages of the invention will be apparent from the following description and the appended claims.

DETAILED DESCRIPTION

Figure 1:
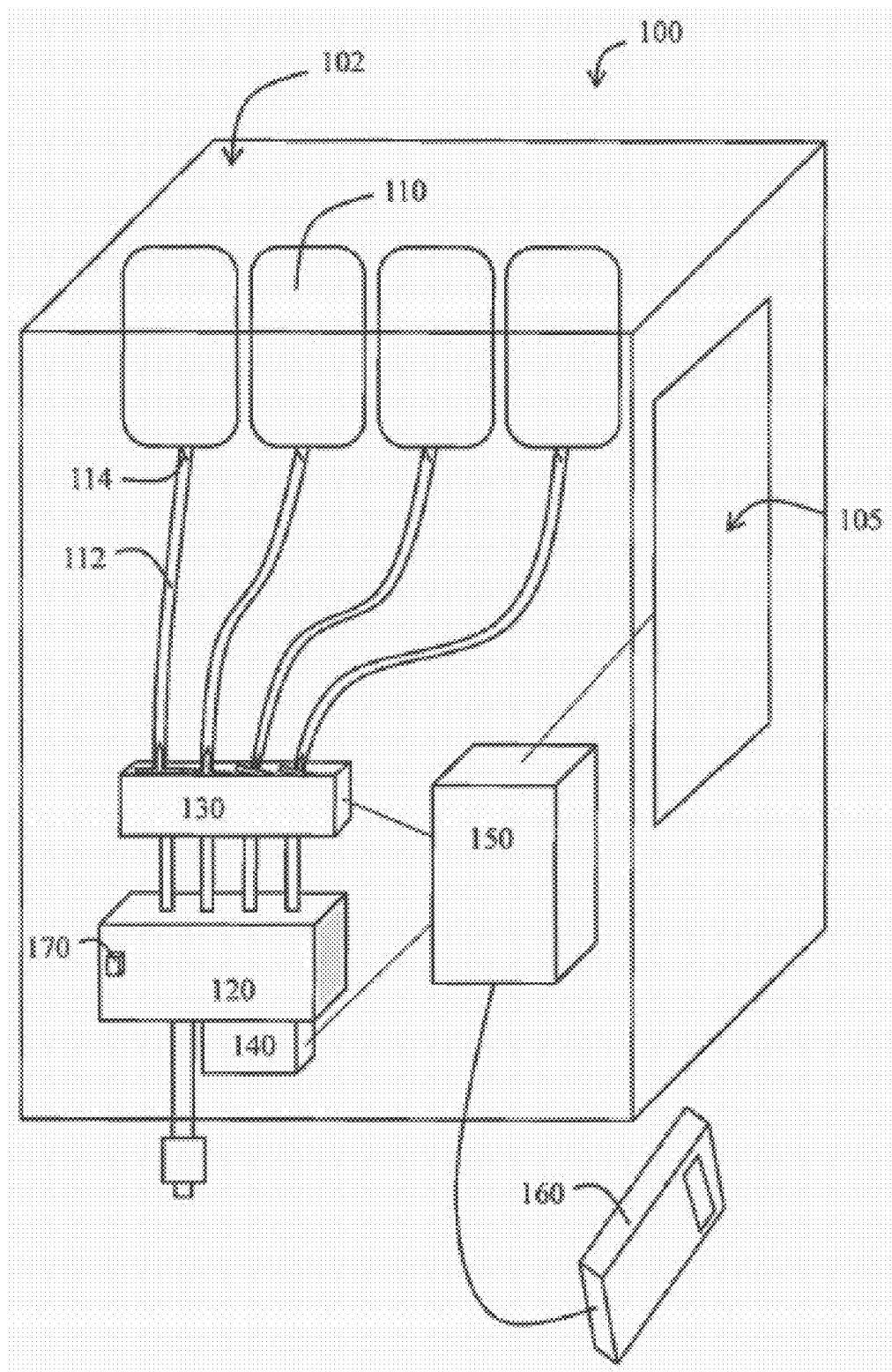
FIG. 1 shows a diagram of a hair dye machine according to embodiments of the present disclosure.

Embodiments of the present disclosure relate generally to machines for formulating and/or mixing hair dye. Further embodiments of the present disclosure relate to methods of formulating hair dye to dye a type of hair a selected color. By using methods of the present disclosure, different types of human hair (e.g., hair having different densities, surface roughness/coarseness, color, or hair having different residual chemicals applied thereto, such as from an original application of hair dye or from a perm) may have hair dye formulated according to the particular properties of the individual hair type in order to more accurately provide the selected hair dye color to the hair.

Machines for formulating and/or mixing hair dye may have the ability to scan a human hair sample, for example, using a high resolution scanner or spectral measurement device, to analyze the properties of the hair sample. Hair data acquired from the scan may be analyzed and/or stored by a computing system disposed within or operatively connected to the machine for formulating and/or mixing hair dye. The computing system may include a display (which may display, for example, hair colors to select, images of users with a predicted hair color, user profiles, input options, and others), a storage device (which may store computer readable program code, user data, historical hair data, etc.), and a processor for executing computer readable program code (for example, instructions to control a control mechanism, instructions to provide a formula for a hair dye color, and instructions to mix dye ingredients according to a formula for a hair dye color). Software including the computer readable program code may determine, through formulas relating hair data representative of hair properties to a selected hair dye color, amounts and types of dye ingredients to make a hair dye that produces an exact color when dyed on a particular hair type. In some instances, the formulas relating hair data representative of hair properties can be based on the historical data of the individual receiving the hair dye treatment. In other instances, the formulas relating hair data representative of hair properties can be based on a combination of the historical data of the individual receiving the hair dye treatment and an aggregate of historical data of a population of other individuals who exhibit similar hair properties and have sought a similar hair dye treatment.

According to embodiments of the present disclosure, a machine for providing hair dye may include a housing, a spectral measurement device, and a dispensing system disposed in the housing, where the dispensing system has at least one storage container and a receptacle to receive one or more dye ingredients stored in the storage container(s). In some embodiments, a dispensing system may also include a pump (e.g., a metering pump) operatively connected to the storage container(s) to pump the dye ingredients from the storage container(s) to the receptacle (e.g., a mixing chamber). In some embodiments, dye ingredients may be flowed from the storage containers to the receptacle without use of a pump, for example, by opening a flow passage extending downwardly from a storage container and allowing the dye ingredient to flow through the flow passage by gravity. The machine may further include a computing system to provide a control mechanism for one or more of the machine components, where the computing system may include a processor, a storage device, an input, and a display, which may act together to control operation of the machine component(s). For example, the computing system may be operatively connected to a dispensing component allowing a dye ingredients to flow from storage container(s) (e.g., a pump or a gate disposed within a flow passage or within an opening to the storage container), where an input in the computing system to dispense one or more dye ingredients may be processed, and computer readable program code stored in the storage device may provide instructions to operate the dispensing component according to the processed input. In another example, the computing system may be operatively connected to a spectral measurement device, where an input in the computing system to scan a hair sample may be processed, and computer readable program code stored in the storage device may provide instructions to operate the spectral measurement device according to the processed input.

Also, for example, the computing system may be operatively connected to a control system which controls an index motor and a linear motor of a dispensing system having a rotary storage containers holder assembly, allowing for selection of specific dye ingredients and transmission of the dye ingredients from the storage containers to other receptacles within the machine, where an input in the computing system to select and dispense one or more dye ingredients may be processed, and computer readable program code stored in the storage device may provide instructions to operate the dispensing system according to the processed input.

FIG. 1 shows a diagram of an example of an apparatus according to embodiments of the present disclosure. The apparatus may be a hair dye machine 100 having a housing 102 holding multiple components for providing a hair dye from multiple stored hair dye ingredients. For example, a dispensing system may be disposed within the housing 102, where the dispensing system may include a plurality of storage containers 110 holding different dye ingredients and flow passages 112 extending from the storage containers 110 to a receptacle 120. The flow passages 112 may be flexible tubing or flow passages having ridge walls, and may be made of plastics or metal. The receptacle 120 may be a mixing chamber or a second storage container, which may mix, store and/or dispense the combined dye ingredients flowed from the storage containers 110.

The dispensing system may further include a pumping device 130 operatively connected to the storage containers 110. In the embodiment shown, the pumping device 130 may be connected to the flow passages 112 extending from the storage containers 110. A gate 114 disposed at an opening of a storage container 110 may be opened, and the pumping device 130 may pump dye ingredients from the storage container 110 through the open gate 114 and through the flow passage 112 into the receptacle 120. In some embodiments, an opening between a storage container and a flow passage may be provided without a gate or other type of closing mechanism. In such embodiments, the pumping mechanism may be disposed along the flow path in a manner to block flow of a dye ingredient from a storage container to a receptacle when the pumping mechanism is not pumping.

A single pumping mechanism may be disposed along individual flow passages 112 extending from the storage containers 110, where each of the pumping mechanisms may be contained in the pumping device 130. In some embodiments, flow passages may have separately contained pumping mechanisms, where each flow passage may have an associated pump disposed along the flow passage.

One or more sensors 170 may be provided along the receptacle 120, flow passages 112, and/or storage containers 110, which may sense the amount of a dye ingredient being dispensed from one or more of the storage containers 110. A sensor 170 may include, for example, a flow sensor (which may sense the rate of fluid flow), a weight sensor, and/or a pressure sensor.

A motor 140 may be operatively connected to the receptacle 120, such that the motor may manipulate the receptacle 120. As shown in FIG. 1, the motor 140 may further be operatively connected to a control mechanism to operate the motor 140. The control mechanism may be part of a computing system 150, either disposed within the housing 102 (as shown in FIG. 1) or disposed outside the hair dye machine housing. In some embodiments, a control mechanism operating the motor may be separate from the computing system 150, and may include a series of electrical components including, for example, an on/off switch and/or a motor speed control. When a control mechanism activates the motor 140, the motor 140 may act to manipulate (e.g., spin, agitate, or otherwise move) the receptacle 120, which may mix dye ingredients disposed within the receptacle 120. For example, according to embodiments of the present disclosure, two or more dye ingredients may be pumped from storage containers 110 through flow passages 112 using pumps in the pumping device 130 (or may flow by gravity from the storage containers through flow passages without use of a pump) into receptacle 120, and the motor 140 may be activated to move the filled receptacle 120 and mix the dye ingredients disposed therein.

In some embodiments, a hair dye machine may be provided without motor 140. For example, two or more dye ingredients may be provided from two or more storage containers into a receptacle. The dye ingredients may then be mixed manually in the receptacle, e.g., by stirring the dye ingredients inside the receptacle, or dye ingredients disposed in a receptacle may be mixed by sealing the filled receptacle and manually shaking the sealed receptacle. In some embodiments, the dye ingredients may be disposed in the receptacle without applying a deliberate mixing action to the filled receptacle.

The hair dye machine 100 may further include a spectral measurement device 160. The spectral measurement device 160 may include, for example, a spectroscope, spectrophotometer, or other device that may emit electromagnetic radiation (e.g., visible light, infrared, ultraviolet light, x-rays, gamma rays, and acoustic waves) toward a hair sample and detect the resulting electromagnetic radiation reflected off the hair sample. For example, a spectral measurement device may include a light source, a component for dividing light into different wavelengths (e.g., a diffraction grating or a prism) and at least one detector. Further, the spectral measurement device 160 may be in the form of a hand held scanner, such as shown in FIG. 1, which may be connected to the computer system 150 by wires or without wires (wireless connection).

In some embodiments, a scanner may be a spectrometer, which may break light from a sample into its spectral components and digitize signals detected by a detector as a function of wavelength. The detected signals may be stored, processed and/or displayed through a computer system in a hair dye machine according to embodiments of the present disclosure. For example, in some embodiments, light may be shown on a hair sample, where spectral components may be absorbed by the hair sample in different amounts. A spaced apart diffraction grating may split the light from the hair sample into different components, where the intensities of each component may be measured separately by a detector. The measured intensities of each component of light from the hair sample may be used to indicate different properties of the hair sample, including but not limited to the presence of different chemical components on the hair, e.g., if an existing hair dye is already present on the hair sample or if chlorine is present on the hair sample (e.g., from the hair being exposed to a chlorinated pool). By performing the dissection and analysis of a hair sample's light, other physical properties of the hair sample may be determined, such as temperature, mass, luminosity and composition.

A computing system 150 may be operatively connected to different components (e.g., the motor 140, pump 130, spectral measurement device 160, and sensor(s) 170) of the hair dye machine for example, through a wired or wireless connection, such as a Bluetooth or other network connection. The computing system 150 may include a processor, associated memory, a storage device, and numerous other elements and functionalities typical of modern computers (not shown). The computer may also include one or more input devices, such as a keyboard, a mouse and/or a touch display, and one or more output devices, such as display. In the embodiment shown in FIG. 1, display 105 may be a touch display for input and output. The computer system 150 may be connected to a local area network (LAN) or a wide area network (e.g., the Internet) via a network interface connection. Those skilled in the art will appreciate that these input and output devices may take other forms, now known or later developed. Further, those skilled in the art will appreciate that one or more elements of the aforementioned computer system 150 may be located at a remote location and connected to the other elements over a network.

Hair data may be collected in the memory of the computing system 150, and processed by the processor of the computing system 150 for storage (e.g., stored in a user profile for later use) and/or for formulating a hair dye. Hair data may be collected from one or more hair analyses (e.g., scanned data collected from spectral measurement device 160 or observational analyses) and/or from a data repository holding historical hair data about hair dye mixtures and user information, for example. Further, hair data stored in a storage device may be compressed and/or uncompressed. In some embodiments, recently acquired hair data may be left uncompressed and may also be maintained in random access memory (RAM) for rapid access and analysis. As used herein, "current" or "recently acquired" data may refer to data collected during operation of a hair dye machine according to embodiments of the present disclosure and/or during performance of a method of the present disclosure for formulating and/or dispensing hair dye (e.g., current hair data collected from a spectral measurement device in communication with a hair dye dispensing apparatus of the present disclosure, where the hair dye dispensing apparatus may formulate and/or dispense hair dye based on the current hair data collected from the operatively connected spectral measurement device), while "historical" data may include data collected prior to operation of a hair dye machine according to embodiments of the present disclosure and/or prior to performance of a method of the present disclosure for formulating and/or dispensing hair dye (e.g., historical hair data may include hair data that is collected and stored in a storage device prior to a current operation of a hair dye machine of the present disclosure). In some instances, historical data may be data collected corresponding to an individual receiving the hair dye treatment. In other instances, historical data may be data collected and aggregated for populations of other individuals who exhibit similar hair properties, individuals who live in the same country or regions of a country, individuals who have sought a similar hair dye treatment, individuals of similar age groups, individuals having similar hair properties such as chemical composition, moisture content, porosity, and density, or any combination thereof. In yet other instances, historical data may be a combination of data collected corresponding to an individual receiving the hair dye treatment and one or more aggregates of populations of other individuals who exhibit similar hair properties, who live in the same country or regions of a country, who have sought a similar hair dye treatment, who are of similar age groups, who have similar hair properties such as chemical composition, moisture content, porosity, and density or any combination thereof.

Software including computer readable program code for instructions to provide hair dye formulas (e.g., a hair dye formula including amounts and types of dye ingredients to make a hair dye that produces an exact color when dyed on a particular hair type) may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the present disclosure.

Storage containers in a hair dye machine according to embodiments of the present disclosure may be air-tight bags, for example, a bag having a dye ingredient sealed therein with a single access point for fluidly connecting a flow passage. Bag storage containers may have a mounting feature (e.g., a mounting hook) for hanging within a hair dye machine according to embodiments of the present disclosure. In some embodiments, storage containers may have walls formed of a rigid material, such that the storage container maintains its shape when positioned within a hair dye machine. Rigid storage containers may have dye ingredients disposed therein with an air-tight seal.

Dye ingredients may include at least one colorant, one or more activators, such as peroxides or other oxidizers, one or more bases, and/or one or more additives, such as a viscosity regulating agent. For example, dye ingredients may include three colorants, each colorant being a different primary color. Various amounts of the primary color colorants may be mixed according to hair dye formulas to produce different hair dye colors. Examples of suitable dye ingredients may include conventionally used additives, including but not limited to antioxidants such as ascorbic acid, erythoboric acid or sodium sulfite to inhibit premature oxidizing, oxidizing agents, fragrances and/or perfume oils, chelating agents, emulsifiers, coloring agents, thickeners (e.g., fatty acid soaps such as alkaline metal salts or alkanolamine salts of fatty acids, oleic acid, myristic acid and lauric acid), organic solvents, opacifying agents, dispersing agents, sequestering agents, humectants, antimicrobials, solvents such as ethanol, isopropanol, polyhydroxy alcohols (e.g., propylene glycol and hexylene glycol), lower alkyl ethers (e.g., ethoxy diglycol), and others known in the art.

The amounts and types of dye ingredients added together to produce a hair dye may be selected according to a hair dye formula that is generated based on one or more properties of a hair sample, such that the produced hair dye may color the hair sample a particular selected color. According to embodiments of the present disclosure, a method of producing a hair dye may include collecting hair data from a hair sample, selecting a hair dye color, providing a formula for a hair dye that colors the hair sample the selected hair dye color, and dispensing amounts of dye ingredients according to the formula to produce the hair dye. The formula for the hair dye includes the amounts and types of dye ingredients for making a hair dye.

Hair data collected from a hair sample may include but is not limited to the chemical composition, moisture content, porosity, and density of the hair sample, for example. Hair data may represent the color and quality of a hair sample. For example, the quality of a hair sample may depend, for example, on whether or not the hair is exposed consistently or intermittently to chlorine (e.g., if the person swims), sunlight or heat, the last time the hair was colored/dyed, if the hair has been permed, or other factors. The chemical composition of a hair sample may be collected, for example, from a spectral measurement device, which may indicate one or more factors of the hair quality. In some embodiments, the chemical composition of a hair sample may be determined using chemical tests. In some embodiments, the chemical composition of a hair sample may be determined using x-ray fluorescence, where high frequency x-rays may be sent to the hair sample to excite the core electrons in the atoms of the hair sample, and received x-rays returning from the hair sample have a characteristic frequency/wavelength that is specific to the elements of the hair sample. The emitted x-rays are collectively measured and converted into a spectrum representative of the elements of the hair sample.

Other tests may be performed on a hair sample to determine one or more properties of a hair sample, for example, tests to determine hair density or tests to determine hair porosity (e.g., determining if a hair has high or low porosity by monitoring if the hair sinks or floats in water or other liquid). In some embodiments, the textural qualities of a hair sample may be analyzed, for example, by viewing the hair sample under a microscope.

Hair data including one or more quantitative and/or qualitative data points may be inputted into a computer system in communication with a hair dye machine according to embodiments of the present disclosure. Hair data from a current hair sample may be stored in a storage device of the computer system. Historical hair data collected from previous hair samples of an individual or one or more populations of individuals may also be stored in a storage device of the computer system. In some embodiments, hair data from user knowledge may be inputted into the computer system, for example. including user inputs characterizing the hair (e.g., a natural hair color may be selected from a list of common color characterizations, such as blonde, light brown, brown, dark brown, red, black, grey, white, etc.) or user inputs of previous hair treatments (e.g., when the last time the hair was colored or chemically treated, the type of previous chemical treatment, if the hair is permed, known chemicals or products used in the hair, previous hair dye color used, and others).

A processor in the computer system may execute computer readable program code having instructions to process hair data of an individual. Hair data may be processed (e.g., sorted into types of hair data, such as density, porosity, and chemical composition, and values assigned to each type of hair data) and inputted into an algorithm that relates hair data to a selected hair color. From the relationship between the hair data and the hair color, a formula for a hair dye may be generated to dye a hair sample the selected hair color. For example, if hair data from a hair sample includes an initial color (e.g., where the initial color may be processed from a spectral measurement device scan into percent values of primary colors, red, blue and yellow, such as initial color=x % blue, y % yellow, and z % red; or where the initial color may be inputted from user knowledge), a chemical composition (e.g., percentage of different chemicals detected from a spectral measurement device scan), and a coarseness of the hair in the hair sample, the algorithm may provide a formula for a hair dye to dye the hair a selected hair color. The hair dye formula may include one or more colorants (e.g., to provide the selected hair color to the initial color of the hair while also accounting for any residual chemicals on the hair from previous hair treatments), an activator (e.g., hydrogen peroxide or other oxidizer), and one or more additives.

The processor in the computer system may also execute computer readable program code having instructions to process hair data of an individual and compare it to the hair data associated with one or more populations of individuals. Hair data may be processed (e.g., sorted into types of hair data, such as density, porosity, and chemical composition, and values assigned to each type of hair data) and inputted into an algorithm that relates hair data to a selected hair color. From the relationship between the hair data and the hair color, a formula for a hair dye may be generated to dye a hair sample the selected hair color. For example, if hair data from a hair sample includes an initial color (e.g., where the initial color may be processed from a spectral measurement device scan into percent values of primary colors, red, blue and yellow, such as initial color=x % blue, y % yellow, and z % red; or where the initial color may be inputted from user knowledge), a chemical composition (e.g., percentage of different chemicals detected from a spectral measurement device scan), and a coarseness of the hair in the hair sample, the algorithm may provide a formula for a hair dye to dye the hair a selected hair color. The hair data and selected hair color can also be correlated with hair data associated with one or more populations of individuals to calculate an anticipated success rate of achieving the selected hair color upon treatment with a hair dye formula.

According to some embodiments, predetermined dye ingredient combinations may be stored in a storage device that is accessible by the processor in the computer system, where the predetermined dye ingredient combinations may be stored in a table format relating a start point to an end point. The table may include multiple starting points to select from (e.g., tens or hundreds of starting points), multiple end points to select from (e.g., thousands or tens of thousands end points), and hair dye formulas (amounts and combinations of dye ingredients) that generate a selected end point from a selected start point. Hair data (including hair data collected from a spectral measurement device such as a spectroscope) may be inputted into the computer system and matched with one of the multiple starting points. For example, spectral hair data may indicate an initial hair color and tone, which may be matched with the color and tone of one of the starting points in the table. An end point may be selected (e.g., by a user or by a customer) from one of the end point options listed in the table, and the predetermined hair dye formula bridging the selected start point to the selected end point may be used for generating the hair dye.

For example, Table 1, provided below, shows an example layout of a table for use in selecting a predetermined dye ingredient combination based on a starting point and desired end point for hair color and tone. In the example shown, representative variables and constants are provided to represent starting and end points, and representative formats are provided to represent predetermined dye ingredient combinations (hair dye formulas) and instructions for application. However, according to embodiments of the present disclosure, over 100 different starting point (e.g., between 100 and 200, or between 100 and 150) and over 10,000 different end points (e.g., greater than 20,000. greater than 25,000, or greater than 30,000) may be provided in a table for selecting a predetermined dye ingredient combination based on selected starting points and end points.

TABLE 1

| Starting Point | End Point | Hair Dye Formula | Instructions |
| --- | --- | --- | --- |
| xN | yN | 2 parts A + 1 part B | Prelighten then reformulate |
| yN | xN | 1 parts A + 3 parts B | Apply hair dye mixture |
| xD | yD | 1 part A + 1 part B + 1 part C | Prelighten then reformulate |
| yD | xD | 1 part A + 3 parts B + 1 part C | Apply hair dye mixture |

In Table 1, the starting and end points may include combinations of levels of colors, where x and y may be equal different levels of color, and levels of tone, where N and D may represent different tones. To get from some starting points to some end points, a hair dye formula may be provided, in addition to steps of applying the hair dye formula. For example, in some embodiments, a portion of the hair dye formula may include a lightening mixture (a combination of ingredients that lightens hair color) that may be applied in a first step to lighten the hair to a certain level. Upon lightening the hair from a first step, a second mixture from the predetermined hair dye formula may be applied in a subsequent second step to dye the hair the end point color and tone. In some embodiments, after hair is lightened in a first step, a second spectral scan of the lightened hair may be performed and a second hair dye formula may be generated based on the hair data collected from the lightened hair. The second hair dye formula may then be applied to the lightened hair to achieve the desired end point hair color and tone.

Further, according to some embodiments, hair dye formulas may also include one or more additives to account for one or more conditions of the hair, which may be determined from a spectral hair scan and/or other hair tests. For example, if a hair sample is determined to be dry (e.g., from the moisture content in the hair sample measured by a spectral measurement device or from a visual inspection of the hair sample), an oil additive may be added to the hair dye formula. In another example, if the pH of a hair sample is collected in the hair data, a corresponding amount of acid or base ingredient may be added to the hair dye formula to result in an overall pH of the dyed hair sample, which may affect the amount the hair shafts open and accept color during the dye process. Additives added to hair dye formulas may include conditioners, silk and/or others provided herein or known in the art.

Hair dye formulas generated or selected based on hair data from spectral measurement devices according to embodiments of the present disclosure may include oxidizing hair dyes, direct hair dyes, and hair dyes using other types of dye mechanisms. Hair dye machines according to embodiments of the present disclosure may dispense different types of hair dyes according to the hair dye formula. For example, in embodiments having an oxidizing hair dye formula generated or selected based on hair data collected from a spectral measurement device, a hair dye machine may dispense the dye ingredients of the hair dye formula, which may include an oxidizing agent.

Once a hair dye formula is generated, computer readable program code may further send instructions to a control mechanism in a hair dye machine according to embodiments of the present disclosure to dispense the amounts and types of dye ingredients of the formula. For example, the control mechanism may send signals to operate one or more gates and/or pumps in a dispensing system of the hair dye machine to dispense the amounts and types of dye ingredients from storage containers in the hair dye machine.

According to embodiments of the present disclosure, dispensing dye ingredients from storage containers in a hair dye machine according to embodiments of the present disclosure may include pumping dye ingredients from at least one storage container into a mixing chamber using at least one pump and sensing the amount of dye ingredients pumped from the storage container(s) with at least one dispensing sensor disposed in the storage container(s). A control mechanism may receive signals from the dispensing sensor(s) and may send signals to the pump(s), for example, to continue pumping, stop pumping, or alter the pump speed.

For example, in some embodiments, a receptacle (e.g., a mixing chamber) disposed within a hair dye machine according to embodiments of the present disclosure may be provided with a scale to measure the weight of the receptacle and contents therein. As one or more dye ingredients are flowed into the receptacle, the scale may send measurements of the receptacle and contents therein to the computing system within the hair dye machine. When a weight criterion is reached, the computing system may send a signal to stop or reduce flow of the dye ingredient(s) into the receptacle, thereby providing a predetermined amount of the dye ingredient(s) into the receptacle.

Other types of sensors (e.g., a flow rate sensor or a pressure sensor) may be provided in a dispensing system in a hair dye machine according to embodiments of the present disclosure to monitor the amount of one or more dye ingredients being dispensed and relay the signals to a control mechanism for controlling the flow of dye ingredients being dispensed based on the amount of dye ingredients already detected as dispensed, in a manner similar to the method described above with respect to the weight sensor/scale.

In some embodiments, a dispensing system may be provided without a sensor. In such embodiments, a predetermined amount of one or more dye ingredients may be dispensed, for example, by operating the dispensing system under known parameters for a predetermined amount of time. For example, a first amount of a first dye ingredient may be dispensed from a storage container in a hair dye machine according to embodiments of the present disclosure by pumping the first dye ingredient from the storage container at a predetermined pumping speed and for a predetermined amount of time to provide the first amount of the first dye ingredient. In some embodiments, a first amount of a first dye ingredient may be dispensed from a storage container by opening a gate to the storage container, thereby allowing the first dye ingredient to flow from the storage container, where the flow rate of the first dye ingredient through a flow passage from the storage container may be predetermined from calculations based on the viscosity of the first dye ingredient and the size and shape of the flow passage, and where the gate may be closed after a predetermined amount of time calculated from the calculated flow rate to provide the first amount of the first dye ingredient.

According to some embodiments of the present disclosure, a method of providing a hair dye may include collecting hair data from a hair sample using a spectral measurement device, selecting a hair dye color, and providing a hair dye that colors the hair sample the selected hair dye color. The spectral measurement device may be provided on, or separate from but in communication with, a hair dye dispensing apparatus according to embodiments of the present disclosure housing dye ingredients for providing the hair dye.

For example, a hair dye machine according to embodiments of the present disclosure may be a kiosk or other type of self-serving hair dye dispensing apparatus, where a user may select a hair dye color from the hair dye machine, and the hair dye machine may dispense a hair dye specifically designed to color a hair sample the hair dye color based on hair data collected from the hair sample by a spectral measurement device.

Figure 2:
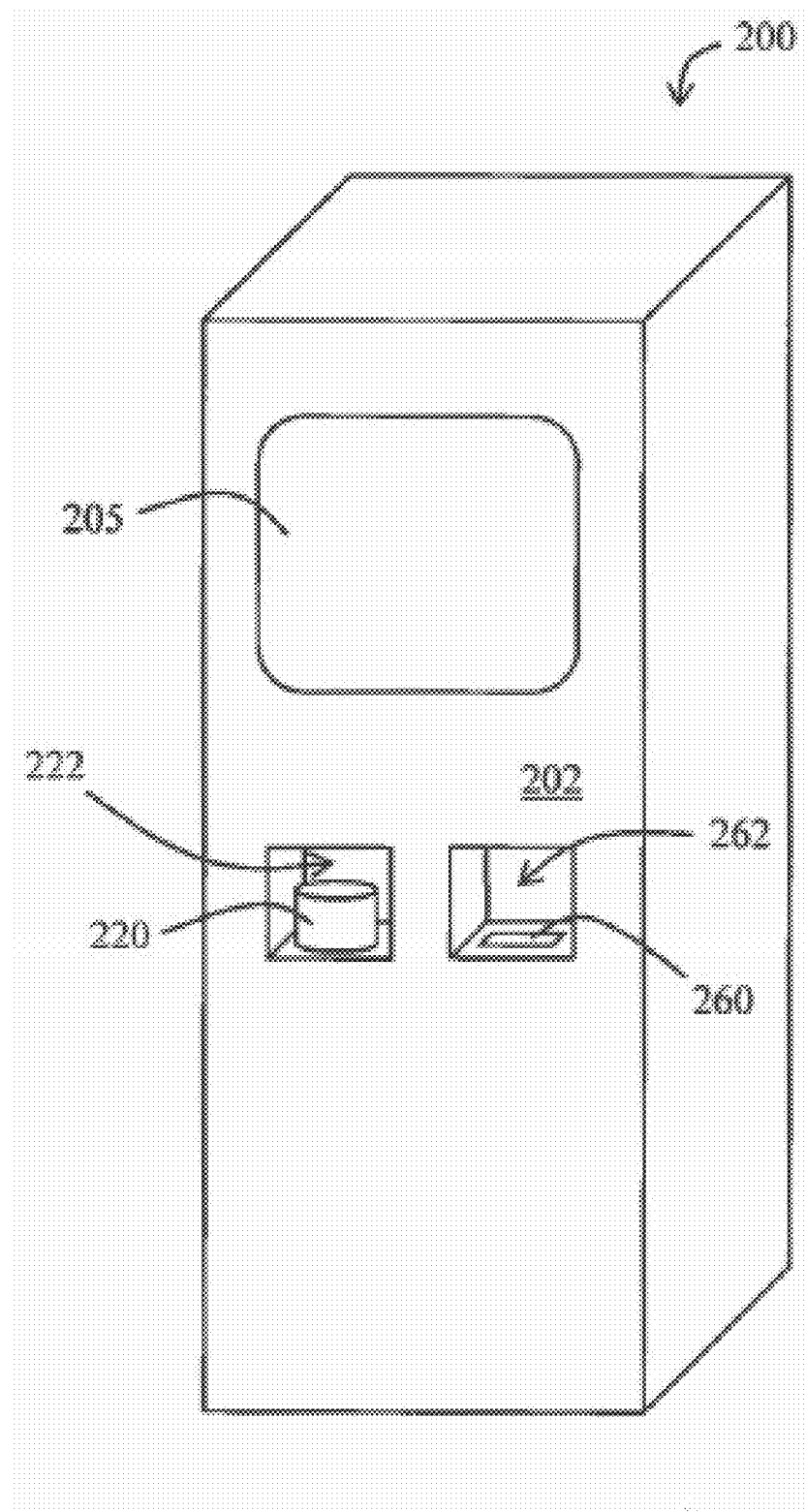
FIG. 2 shows a perspective view of a hair dye machine according to embodiments of the present disclosure.

FIG. 2 shows an example of a hair dye dispensing apparatus according to embodiments of the present disclosure in the form of a kiosk 200. The kiosk 200 includes a housing 202, which houses a computing system and a dispensing system. A spectral measurement device 260 is provided in a sample cavity 262 formed in the housing 202. In other embodiments, a spectral measurement device may be separate from the kiosk body but in communication with the computing system in the kiosk, e.g., a spectral measurement device may be in the form of a hand held scanner that is wired to the kiosk or in wireless communication with the kiosk. The kiosk 200 may also have a dispensing output 222 formed in the housing 202, where a receptacle 220 may be positioned to receive hair dye being dispensed from the kiosk 200.

Further, a display 205 may be provided along an outer wall of the kiosk 200. The display 205 may be used to provide inputs from a user to the computing system (where the display may be a touch display), or a keyboard and/or mouse may be provided with the kiosk 200 for inputting information by a user. The display 205 may further be used to display outputs from the computing system.

For example, according to embodiments of the present disclosure, multiple hair dye colors may be shown on the display 205. A user (e.g., a customer at a store or a stylist at a salon) may select one of the hair dye colors. In some embodiments, a particular hair dye color may be searched for by name, which may be pulled from a database of hair dye colors in the computing system of the kiosk, where the searched hair dye color name and/or an image of the searched hair dye color may be displayed on the display of the kiosk.

In some embodiments, an image of a user may be displayed on the display 205, and a selected hair dye color may be applied to the hair in the image of the user to provide a prediction of what the user will look like with the selected hair dye color.

In some embodiments, hair data from a hair sample representative of a user's hair may be collected from the spectral measurement device 260, which may be processed in the computing system of the kiosk 200 to provide a formula for hair dye capable of dyeing the hair sample the selected hair dye color. For example, a hair sample may be deposited into the sample cavity 262 and the spectral measurement device 260 may detect one or more properties of the hair sample (e.g., chemical composition of the hair). The computing system in the kiosk 200 may then formulate a hair dye formula for hair dye capable of dyeing the hair sample the selected hair dye color. The dispensing system within the kiosk 200 may then dispense multiple dye ingredients into a receptacle 220 from multiple storage containers within the kiosk 200 in amounts corresponding to the hair dye formula to dispense the hair dye.

In some embodiments, hair data collected from sources other than a spectral measurement device may be inputted into an algorithm stored as computer readable program code for providing a formula for hair dye. For example, observational hair data, such as hair color, hair texture, etc., and/or historical hair data, such as date entries for previous hair treatments, types of previous hair treatments, previously used hair dyes, etc., may be inputted by a user. Various types of hair data, including hair data collected from a spectral measurement device and hair data collected from one or more similar populations of individuals, may be inputted into an algorithm for providing a formula for hair dye capable of dyeing hair a selected color, where the formula includes amounts and types of hair dye ingredients, and mixing the amounts of dye ingredients to make the hair dye.

The computing system in the kiosk 200 may have at least one stored user profile stored in a storage device or accessible from the cloud, where a user profile may include historical hair data of the user, for example, previous hair dye formulas used by the user, previous hair treatments of the user, age of the user, natural hair color of the user, etc. A user having his or her profile stored and accessible by the computing system of the kiosk 200 may have the profile accessed, for example, when the user instructs the kiosk 200 to dispense a previously used hair dye color and/or when the user instructs the kiosk 200 to formulate a new hair dye color.

For example, a user profile may include historical hair data, such as a natural hair color of the user. The natural hair color of the user may be quantified by measurements from a spectral measurement device, e.g., x % blue, y % yellow, and z % red, where x, y, and z may each range between 0 and 100%. The user profile may also include current hair data, such as moisture content, porosity and density. Based on hair data in the user profile, an algorithm may formulate a hair dye formula for dyeing the user's hair a selected hair dye color.

According to embodiments of the present disclosure, a spectral measurement device, such as a spectroscope, spectrophotometer, or similar device that projects light divided into component wavelengths onto a sample and measures a returning light spectrum from the sample may be used to collect hair data. Spectral measurement devices may project light divided into component wavelengths onto a hair sample, and the resulting light reflection (or absorption spectra) may be analyzed by a computer system, which produces an analysis of the hair properties. The hair properties determined from the spectral measurement device scan may be a starting point for formulating a hair dye formula. Once a user inputs a desired hair color (the ending point), a hair dye machine according to embodiments of the present disclosure may mix and dispense the correct hair dye color to dye the hair the desired hair color, ready for use by a stylist or other end user.

Embodiments of the present invention may be implemented with various computers, such as workstations, PCs, laptops, servers, and supercomputers. Further, the invention may be implemented on virtually any type of computer regardless of the platform being used. For example, a computer system includes a processor, associated memory, a storage device, and numerous other elements and functionalities typical of today's computers (not shown). The computer system may also include input means, such as a keyboard and a mouse, and output means, such as a monitor. The computer system is connected to a local area network (LAN) or a wide area network (e.g., the Internet) via a network interface connection (not shown). Those skilled in the art will appreciate that these input and output means may take other forms.

Software instructions to perform embodiments of the invention may be stored on a computer readable medium such as a compact disc (CD), a diskette, a tape, a file, or any other computer readable storage device. Furthermore, various memories (or storage means) may be used to store programs having instructions for performing the techniques of the present invention. The program of instructions may be in object code or source code. The precise form of the program storage device and of the encoding of instructions is immaterial for the purposes of this invention.

In one or more embodiments, the data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

Figure 3:
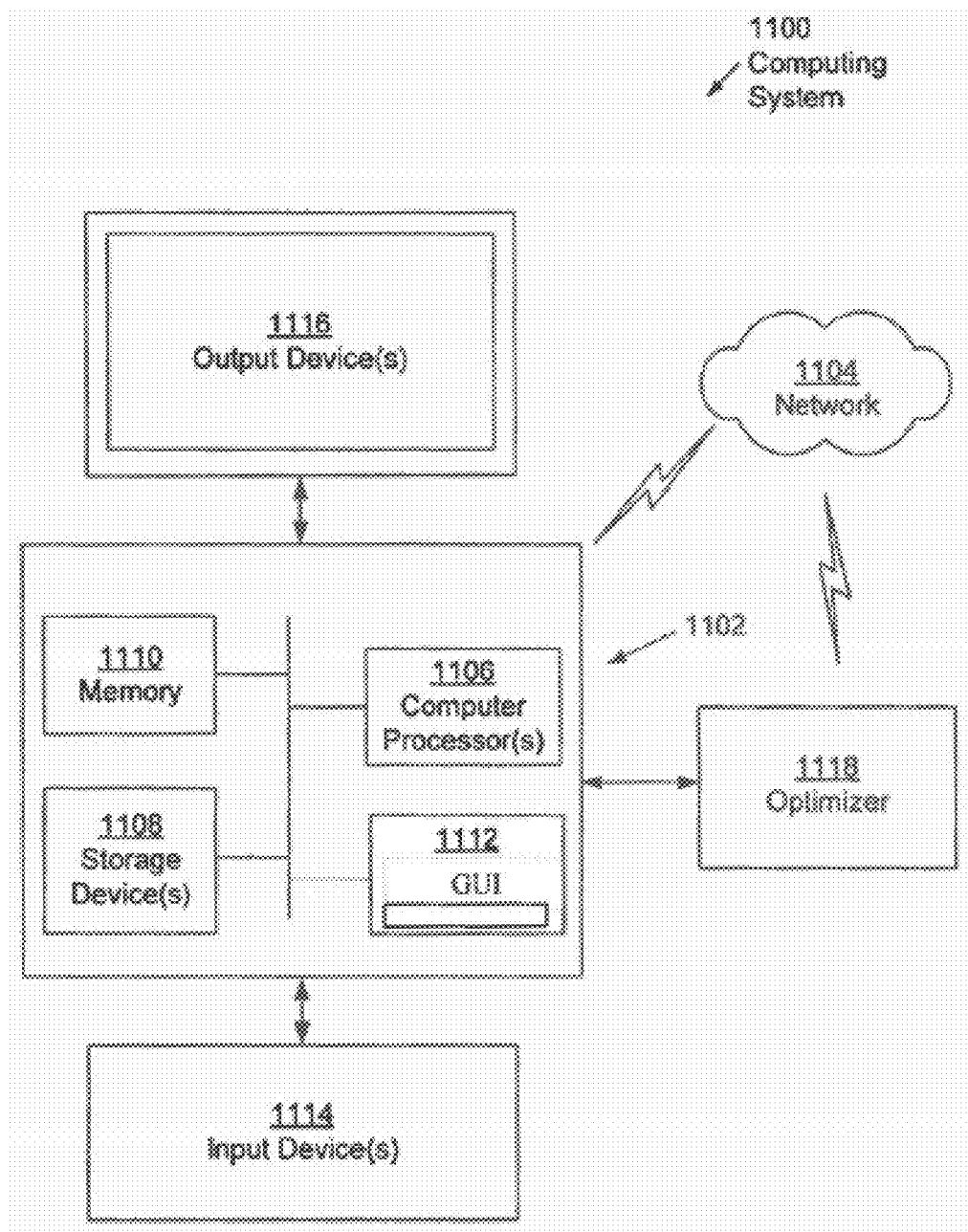
FIG. 3 depicts a system with which one or more embodiments of the present disclosure may be implemented.

FIG. 3 depicts a computing system with which one or more embodiments of the present disclosure may be implemented. In one or more embodiments, one or more of the modules and elements shown in FIG. 3 may be omitted, repeated, and/or substituted. Further, in one or more embodiments, the various components of the computer system may be combined in an alternative manner. Accordingly, embodiments of the present disclosure should not be considered limited to the specific arrangements of modules shown in FIG. 3.

As shown in FIG. 3, a computing system 1100 includes a computing device 1102 having one or more processors 1106, one or more storage devices 1108 (e.g., a hard disk, an optical drive such as a compact disk (CD) drive or digital versatile disk (DVD) drive, a flash memory stick, etc.), memory 1110 (e.g., random access memory (RAM), cache memory, flash memory, etc.), and a graphical user interface (GUI) 1112. The computing processor(s) 1106 may be an integrated circuit for processing instructions. For example, the computing processor(s) may be one or more cores, or micro-cores of a processor. Further, processors(s) 1106 may include different kinds of processors, such as a central processing unit ("CPU") or a graphics processing unit ("GPU"). Memory 1110 may include a number of software or firmware modules executable by processor 1106. Memory 1110 may include a single memory device or multiple memory devices. Memory 1110 and storage 1108 may comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

The storage device(s) 1108 (and/or any information stored therein) may include a data store such as a database, a file system, one or more data structures (e.g., arrays, link lists, tables, hierarchical data structures, etc.) configured in a memory, an extensible markup language (XML) file, any other suitable data structure for storing data, or any suitable combination thereof. The storage device(s) 1108 may be a device internal to the computing device 1102, or the storage device(s) 1108 may be an external storage device operatively connected to the computing device 1102. According to some embodiments, the storage device(s) 1108 may include a data repository having stored parameters from hair sample tests (e.g., from spectral measurement tests), stored parameters inputted by a user (e.g., age of user, previous hair dye color used, date and/or type of previous perm, etc.), where at least one of the stored parameters may be submitted parameters into an algorithm for formulating a hair dye. Additionally, the computing device 1102 may include numerous other elements and functionalities.

The computing device 1102 may be communicatively coupled to a network 1104 (e.g., a local area network (LAN), a wide area network (WAN) such as the Internet, a cloud-based network, a mobile network, a personal network, or any other type of network) through wires, cables, fibers, optical connectors, a wireless connection, or a network interface connection (not shown). Each of these networks can contain wired or wireless programmable devices and operate using any number of network protocols (e.g., TCP/IP). The network may be connected to gateways and routers, servers, and end user computers.

The computing system 1100 may also include one or more input device(s) 1114, such as a touchscreen, keyboard, mouse, microphone, touchpad, electronic pen, or any other type of input device. In some instances, the one or more input device(s) 1114 can be a smartphone, a tablet, a laptop, or a camera operatively coupled with computing system 1100 via a wired or wireless connection such as a Bluetooth connection. Further, the computing system 1100 may include one or more output device(s) 1116, such as a screen (e.g., a liquid crystal display (LCD), a plasma display, a light emitting diode (LED) display, such as an OLED display, a cathode ray tube (CRT) monitor, a projector, a 2D display, a 3D display, or other display device), a printer, external storage, or any other output device. One or more of the output device(s) 1116 may be the same or different from the input device(s). The input and output device(s) may be locally or remotely (e.g., via the network 1104) connected to the computer processor(s) 1106, memory 1110, storage device(s) 1108, and GUI 1112. While in FIG. 3 the GUI 1112 is shown as an element separate from the memory 1110, one of ordinary skill in the art will appreciate that the GUI 1112 is a module within the memory 1110. Many different types of computing systems exist, and the aforementioned input and output device(s) may take other forms.

Further, one or more elements of the computing system 1100, such as for example a storage device(s) 1108, may be located at a remote location and connected to the other elements over a network 1104. Further, embodiments of the disclosure may be implemented on a distributed system having nodes, where each portion of the disclosure may be located on a different node within the distributed system. In one embodiment of the disclosure, the node corresponds to a distinct computing device. In another embodiment, the node may correspond to a computer processor with associated physical memory. In another embodiment, the node may correspond to a computer processor or micro-core of a computer processor with shared memory and/or resources. For example, multiple hair dye machines according to embodiments of the present disclosure may be used in a salon or multiple salons (or other stores), where each hair dye machine may have a node communicating with a central network to access, for example, historical hair data and/or formulas for hair dye colors.

The GUI 1112 may provide an interface to be operated by a user (e.g., a customer wanting to dye his/her own hair, a stylist, an employee, or any other party) using one or more input devices 1114 and the GUI 1112 may be displayed on one or more output devices 1116 coupled to the computing device 1102. In some instances, the input device 1114 and the output device 1116 is the same. The GUI 1112 may include one or more buttons (e.g., radio buttons), data fields (e.g., input fields), banners, menus (e.g., user input menus), boxes (e.g., input or output text boxes), tables (e.g., data summary tables), sections (e.g., informational sections or sections capable of minimizing/maximizing), screens (e.g., welcome screen or home screen), and/or user selection menus (e.g., drop down menus). In addition, the GUI 1112 may include one or more separate interfaces and may be usable in a web browser or as a standalone application.

Although the output device(s) 1116 is shown as being communicatively coupled to the computing device 1102, the output device(s) 1116 may also be a component of the computing device 1102.

In FIG. 3, the computing device 1102 may have a management application capable of designing and providing a formula for a particular hair dye capable of dyeing a particular hair type a selected color. The selected color to be designed and/or formulated may be selected by a user. The user may select from a pre-existing library of hair dye colors or may manually input parameters for any hair dye color, for example. In one or more embodiments, the user may input or define one or more hair data parameters (e.g., date and type of last hair coloring or highlighting) in addition to having spectral measurement data of one or more hair samples inputted as hair data parameters (e.g., a spectral map of primary color elements forming the initial hair color of a hair sample).

In one or more embodiments, the GUI 1112 may receive, via an input module, a request to access historic data. The request may be in the form of user input. The historic data may include, for example, previously formulated hair dye colors for a particular user, previous dates or types of hair treatments of the user (e.g., when the last time the user had his/her hair highlighted, penned or other treatment type), and previously formulated hair dye colors for one or more populations of users, and may be stored, for example, in storage device(s) 1108. The user may be presented with options for hair dye color based on the historic data via the GUI 1112. In response to receiving a user selection, the computing device 1102 may execute instructions on the computing processor(s) 1106 to formulate a hair dye formula for the selected color, using hair data parameters selected or inputted by the user and inputted by a spectral measurement scan.

After generating a formula for a hair dye color capable of dyeing a hair sample a selected color, one or more selection parameters may be visualized by the GUI 1112 on the output device(s) 1116. In one embodiment, the visual outputs may include a list of dye ingredients for the formulated hair dye and/or a reference identification (e.g., a barcode, a reference name of the dye color, or other reference number identification) to label the formulated hair dye (e.g., which may be used later to reference the formulated hair dye). Additionally, the outputs may be in the form of graphs and may be represented as percentages or ratios (e.g., outputs of hair data collected from a current spectral measurement device compared to previously collected historical hair data from past spectral measurement device(s) may show different parameters over a function of time, or outputs of the chemical composition of a hair sample may be shown in a spectral graph).

In some embodiments, a visual output may include an image of a user having a predicted view of the formulated hair dye applied to the user's hair. In such embodiments, the user may upload a picture of the user into the computing device 1102. After a hair color is selected and a hair dye is formulated to dye the user's hair the selected hair color based on one or more hair data collected from a spectral measurement device, the computing device 1102 may output the image of the user having the formulated hair dye applied to the user's hair.

The computing system 1102 may further have a control mechanism to operate one or more components in a hair dye dispensing apparatus according to embodiments of the present disclosure. For example, computer readable program code having instructions for operating one or more components of a hair dye machine (operating computer readable program code) may be stored in the storage device(s) 1108 or memory 1110. When a user inputs to dispense a formulated hair dye, the computer processor(s) 1106 may execute appropriate operating computer readable program code to send one or more signals to a component of the hair dye machine (e.g., instructions to operate a control system, instructions to operate one or more pumps at a pumping speed in order to dispense an amount of one or more dye ingredients, instructions to manipulate a receptacle filled with dye ingredients in order to mix the dye ingredients, and other instructions for operating dispensing features of the hair dye machine).

In one or more embodiments, operating computer readable program code may be modified using an optimizer 1118. The optimizer 1118 may be connected to the computing device 1102, or may be integral with the computing device 1102. The optimizer 1118 may also be connected to the computing device 1102 or accessibly by the computing device 1102 using network 1104. The optimizer 1118 may modify one or more parameters of a dispensing operation to provide dispensed amounts of dye ingredients that more accurately correspond to the calculated amounts of dye ingredients in the formula for the hair dye color.

For example, a dispensing operation may be performed where multiple dye ingredients are dispensed into a receptacle in amounts corresponding to a formula for a selected hair dye color. The multiple dye ingredients may be dispensed in the formulated amounts when a control mechanism in the computing system sends signals to one or more components along storage containers and/or flow paths from the storage containers to operate under parameters that allow the formulated amounts to flow from the storage containers, through the flow paths, and into the receptacle. One or more dispensing sensors may be positioned along the storage containers, flow paths and/or receptacle to detect if the actual amounts of dispensed dye ingredients match the formulated amounts of dye ingredients. The sensor data may be processed by the computer processor(s) 1106 to determine differences between the actual amounts of dispensed dye ingredients and the formulated amounts of dye ingredients. When differences between the actual amounts of dispensed dye ingredients and the formulated amounts of dye ingredients are determined, the optimizer 1118 may modify one or more input parameters of the dispensing operation to dispense actual amounts of dye ingredients closer to the formulated amounts of dye ingredients. The modification of input parameters to a dispensing system by the optimizer 1118 may be made during a dispensing operation (e.g., to alter a pump speed as a dye ingredient is being dispensed to regulate the amount of the dye ingredient being pumped) or may be made after a dispensing operation (e.g., to provide the optimized dispensing instructions for a subsequent dispensing operation).

Methods of the present disclosure may include formulating a hair dye to dye a hair sample a selected color based on properties of the hair sample selected from the chemical composition, moisture content, porosity, and/or density of the hair sample. For example, according to embodiments of the present disclosure, a method of formulating a hair dye may include collecting hair data from a hair sample, the hair data selected from the group consisting of chemical composition, moisture content, porosity, and density; selecting a hair dye color; providing a formula for a hair dye that colors the hair sample the selected hair dye color; and dispensing the amounts of dye ingredients to produce the hair dye. Hair data characterizing the properties of a hair sample may be collected using a spectral measurement device (such as described above) and/or by using other chemical tests or measurement devices.

Figure 4:
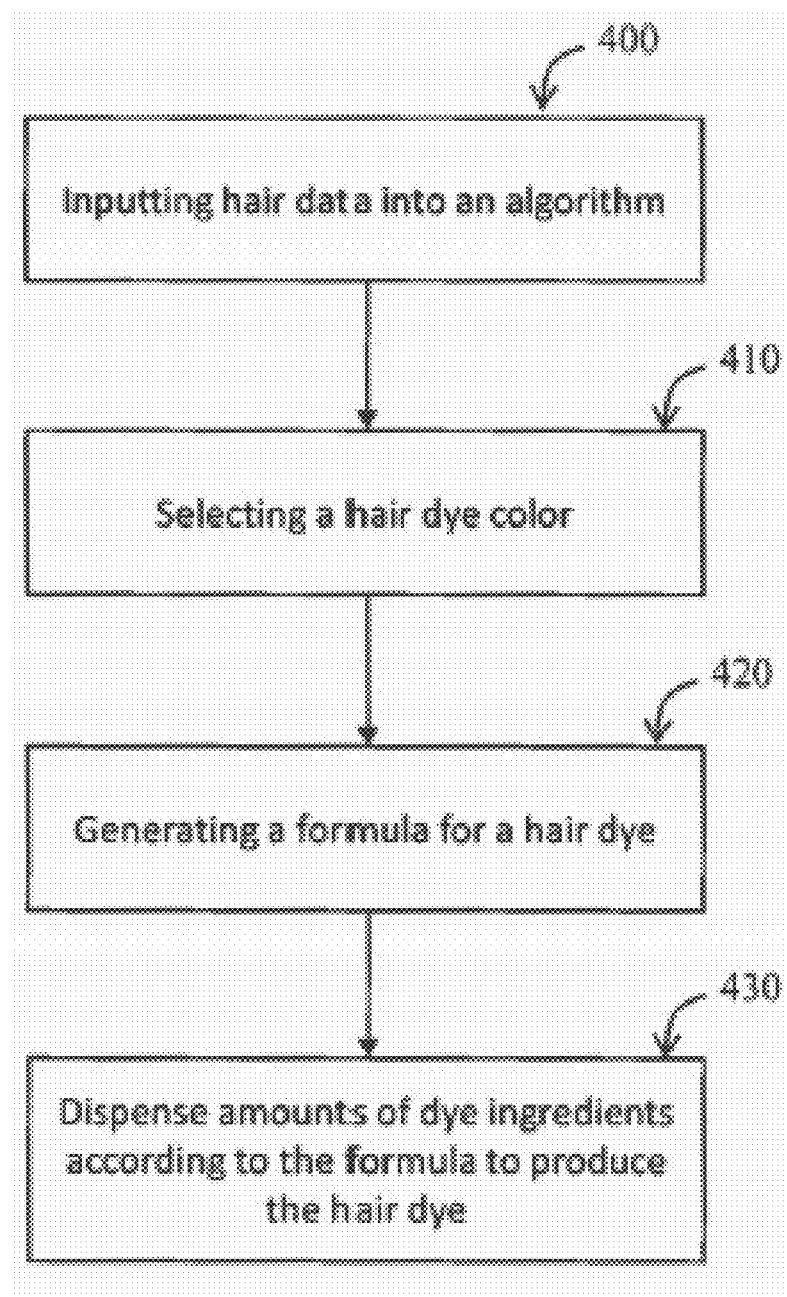
FIG. 4 shows a method according to embodiments of the present disclosure.

FIG. 4 shows an example of a method for providing a hair dye according to embodiments of the present disclosure. As shown, the method may include inputting hair data into an algorithm for formulating a hair dye 400. The hair data may include at least one of the chemical composition, moisture content, porosity, and density of a hair sample, which may be collected, for example, from a spectral measurement device, a density measurement device, or chemical testing. The algorithm for formulating a hair dye may include, for example, a series of "if then" relationships between hair data starting points and selected hair dye color ending points. For example, hair data starting points including numerical representations of a hair sample color (e.g., percent of 100 values of the primary colors, red, blue and yellow forming an initial color of the hair sample) and chemical composition (e.g., percent of 100 values for chemicals detected in the hair sample) and a selected hair dye color may be inputted into an algorithm for formulating a hair dye that provides the selected hair dye color to the hair sample. The hair dye color may be selected 410, for example, from a list of color names, a display of color images, or from previously used hair dye colors (e.g., from historical data saved in a user profile).

Amounts and types of dye ingredients (a hair dye formula) may then be generated based on the relationship between the hair data starting points the selected hair dye color 420. For example, an algorithm may include if then relationships that include if certain types of chemicals are indicated in the hair data, then certain types of dye ingredients are selected for use in the generated hair dye formula. Further, an algorithm may include if then relationships that include if certain amounts of chemicals are indicated in the hair data, then certain amounts of dye ingredients are selected for use in the generated hair dye formula. In another example, an algorithm may include if then relationships that include if certain numerical representations of a hair color are indicated in the hair data, then certain amounts of colorants in the dye ingredients are selected for use in the generated hair dye formula.

Upon generating a formula for a hair dye based on the hair data and selected hair dye color, instructions may be sent to a dispensing system within a hair dye machine according to embodiments of the present disclosure to dispense the amounts of dye ingredients provided by the hair dye formula in order to produce the hair dye 430.

One of ordinary skill in the art may recognize that additional or alternative steps may be used to produce a hair dye in the method shown in FIG. 4, such as the steps described herein (e.g., historical hair data may be inputted in combination with current hair data collected from a spectral measurement device).

In some embodiments, an optimization step may be utilized in a method of producing a hair dye, where a hair sample dyed with a produced hair dye color may be tested (e.g., scanning the hair sample with a spectral measurement device or performing other chemical testing) to determine properties of the dyed hair sample. Hair data from the tested dyed hair sample may be collected and inputted into a computing system. In some embodiments, the dyed hair sample hair data may be compared with the selected hair dye color ending points utilized in the method of providing the hair dye, for example, to determine the accuracy of the algorithm used in generating the formula for the hair dye and/or to determine the accuracy of the dispensing system. In some embodiments, the dyed hair sample hair data may be used to generate a second formula for a second hair dye, for example, when a user wants to further change the hair (e.g., if the user does not like the outcome of the first hair dye application).

Figure 5:
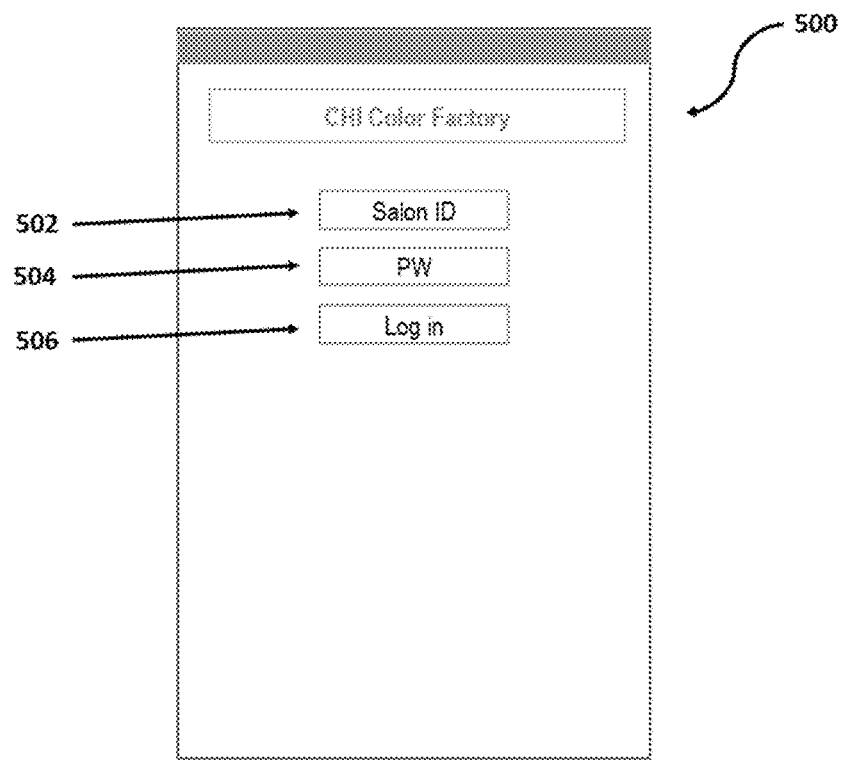
FIG. 5 shows an exemplary login screen in accordance with embodiments of the present disclosure, viewable on a user interactive display of a kiosk and/or an input device of a computing system, for data input and analysis by a user.

FIGS. 5-11 further illustrate user interactive features in accordance with various aspects of the present disclosure. FIG. 5 illustrates an exemplary login screen 500, which may be displayed on a user interactive display (for example, a touchscreen) of a kiosk such the display 205 of the kiosk 200 and/or an input device (for example, a touchscreen) of a computing system such as input device(s) 1114 of computing system 1100, for data input and analysis by a user. In the login screen 500, a user, such as a hair stylist, may input their salon ID 502 and password 504 a log in by clicking on the log in button 506.

Figure 6:
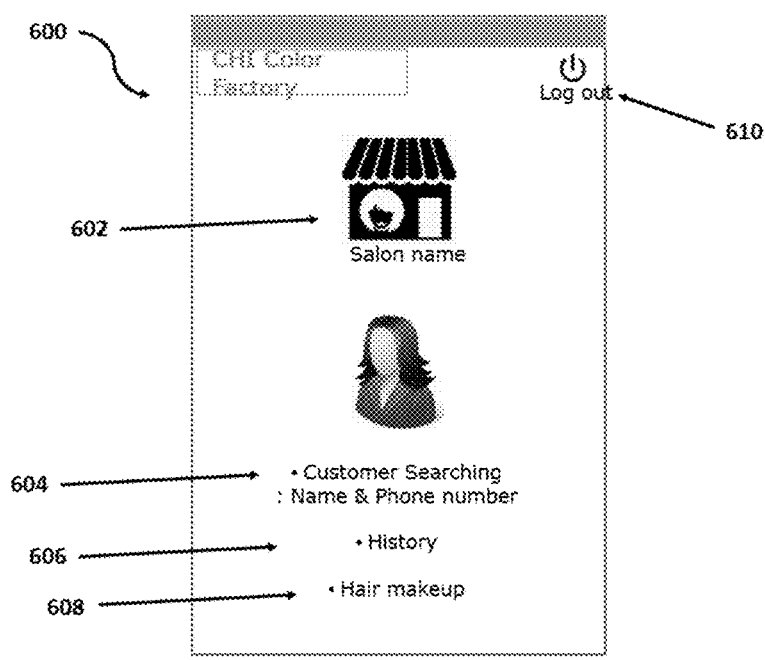
FIG. 6 shows an exemplary customer search screen in accordance with embodiments of the present disclosure, viewable on a user interactive display of a kiosk and/or an input device of a computing system, for data input and analysis by a user.

After successfully logging in, the user may proceed to a customer search screen 600 as illustrated in FIG. 6. In the customer search screen 600, the salon location associated with the user is displayed at salon name 602. The customer search screen 600 can be displayed on a user interactive display (for example, a touchscreen) of a kiosk such the display 205 of the kiosk 200 and/or an input device (for example, a touchscreen) of a computing system such as input device(s) 1114 of computing system 1100. The user can confirm the salon location in salon name 602 or, if the user is currently located at a different salon, can update the location by accessing other salon locations and choosing the correct salon location where user is situated. The user can search for a customer by inputting a customer name and/or phone number into a customer searching tab 604.

Once the customer information is obtained, historical hair data of the customer, can be accessed through a history tab 606. Through the history tab 606, hair data collected from previous hair samples may be accessed from a storage device of the computer system. In some embodiments, hair data from user knowledge may be inputted into the computer system, for example, including the age of the customer, user inputs characterizing the customer's hair (e.g., a natural hair color may be selected from a list of common color characterizations, such as blonde, light brown, brown, dark brown, red, black, grey, white, etc.) or user inputs of previous hair treatments (e.g., when the last time the hair was colored or chemically treated, the type of previous chemical treatment, if the hair is permed, known chemicals or products used in the hair, previous hair dye color or formula used, and others). Historical hair data can also include previously acquired data related to factors such as moisture content, porosity and density of the customer's hair. Current hair data of the customer, such as the same types of data stored as historical hair data, can be inputted into the computer system via the hair makeup tab 608. The user may also log out of the kiosk or system by clicking the log out button 610.

Figure 7:
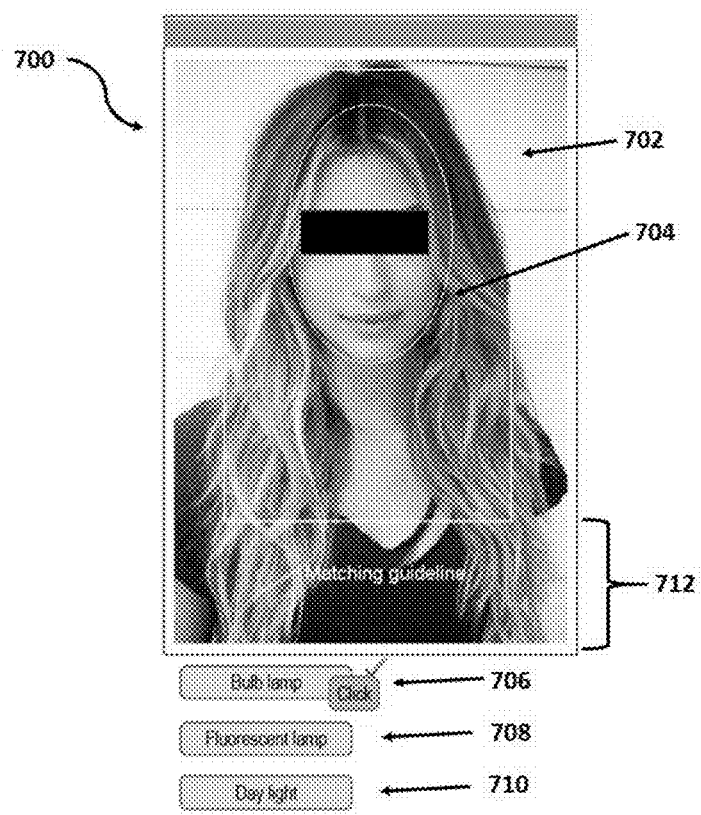
FIG. 7 shows an exemplary means of obtaining the hair color data of a customer in accordance with embodiments of the present disclosure.

FIG. 7 illustrates a means of obtaining the hair color data of a customer. The means of hair color data acquisition of FIG. 7 can be used upon entry of the customer into the salon or after a first, second or higher hair color dye or formula application to the customer's hair. To obtain the current hair color data of a customer, the stylist can take a photograph 700 of the customer using an input device such as a smartphone, table, laptop computer or camera. The input device can then upload the photograph into the computing system for hair color data determination and can be displayed for user interfacing (i.e., further data input and or analysis) on a display (for example, a touchscreen) of a kiosk such the display 205 of the kiosk 200 and/or of an input device (for example, a touchscreen) of a computing system such as input device(s) 1114 of computing system 1100. Regions of the photograph corresponding to the face and hair of the customer can be identified as region 702 and region 704 respectively.

To ensure accuracy in the analysis of hair color data derived from the photograph 700, the user may specify how the photograph was obtained. Specifically, the user can input whether the photograph 700 was obtained using, for example, a bulb lamp as the light source, a fluorescent lamp as the light source, or day light as the light source by clicking on a bulb lamp button 706, a fluorescent lamp button 708, or a day light button 710, respectively. In some instances, the user can remove regions of the photograph 700, such as region 712, to further ensure accuracy of the analysis of hair color data derived from the photograph 700.

Figure 8:
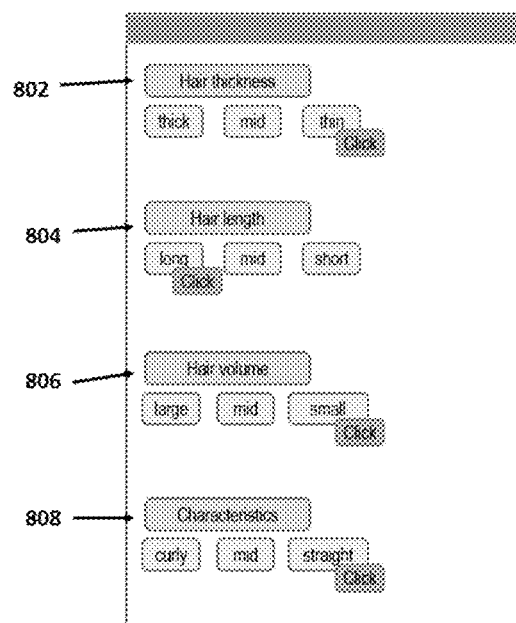
FIG. 8 shows exemplary hair data that can be manually inputted into a computing system, via an input device of a computing system, according to various aspects of the present disclosure.

FIG. 8 illustrates exemplary hair data that can be manually inputted into a computing system, via a user interactive display (for example, a touchscreen) of a kiosk such the display 205 of the kiosk 200 and/or an input device (for example, a touchscreen) of a computing system such as input device(s) 1114 of computing system 1100, according to various aspects of the present disclosure through the hair makeup tab 608 of FIG. 6. In some instances, under a hair thickness field 802, the user can specify the customer's hair as thick, thin or a medium ("mid") thickness. In some instances, under a hair length field 804, the user can specify the customer's hair as long, short or a medium ("mid") length. In some instances, under a hair volume field 806, the user can specify the customer's hair as large, small or a medium ("mid") volume. In some instances, under a hair characteristics field 808, the user can specify the customer's hair as curly, straight or somewhere therebetween. In other instances, a field for the characterization of hair as dry, oily or normal can be displayed in the hair makeup tab 608.

Figure 9:
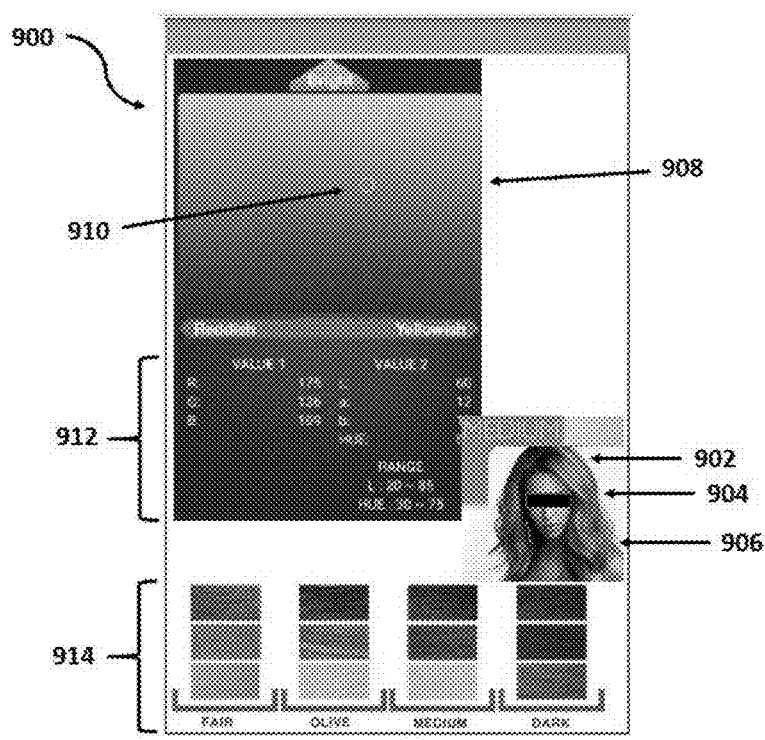
FIG. 9 shows an exemplary graphical display, of a kiosk and/or an input device of a computing system, of the results of a color analysis of a customer's hair using a spectral measurement device in accordance with various aspects of the present disclosure.

FIG. 9 illustrates an exemplary graphical display of the results of a color analysis of a customer's hair using a spectral measurement device in accordance with various aspects of the present disclosure. In FIG. 9, a color analysis graphical display 1000 can be displayed on a user interactive display (for example, a touchscreen) of a kiosk such the display 205 of the kiosk 200 and/or an input device (for example, a touchscreen) of a computing system such as input device(s) 1114 of computing system 1100.

To begin, a user can select multiple regions of a customer's hair, such as hair regions 902, 904, 906, and take a predetermined number of hair color measurements in each region using a spectral measurement device. More or less hair regions can be measured as required. The data acquired in each selected hair region can be correlated with color point 910 in a color spectrum 908. In some instances all of the data obtained for each region can be averaged into a single color point 910. In other instances, data for each selected hair region can be defined as its own color point in the color spectrum 908. Data 912 corresponding to the color point 908 can be summarized in terms of red (R), green (G) and blue (B) values as well as in the CIE 1976 color space to yield lightness (L), green-blue (a), blue yellow (b) and hue values. Skin tone data can be similarly acquired. Based on the acquired hair data, general hair dye color palates 914 for varying skin tones, such as fair, olive, medium and dark can be generated on the color analysis graphical display 1000.

Figure 10:
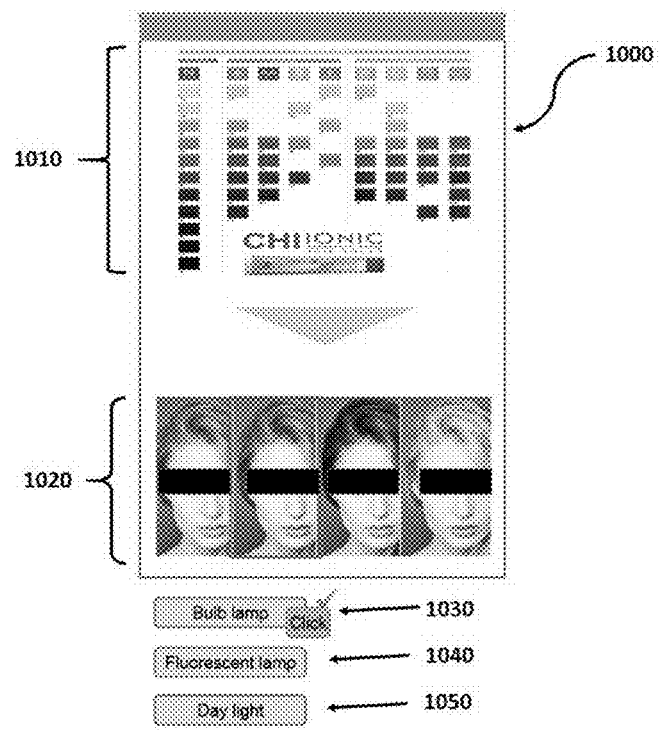
FIG. 10 shows an exemplary graphical display, of a kiosk and/or an input device of a computing system, for the selection of hair color options in accordance with various aspects of the present disclosure.
Figure 11:
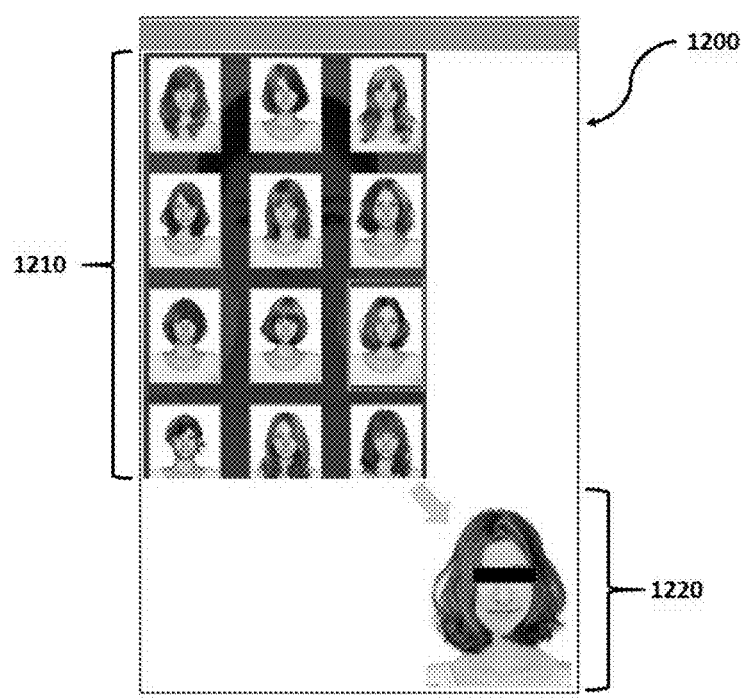
FIG. 11 shows an exemplary graphical display, of a kiosk and/or an input device of a computing system, for the selection of hair style options in accordance with various aspects of the present disclosure.

FIG. 10 illustrates an exemplary graphical display for the selection of hair color options in accordance with various aspects of the present disclosure. In FIG. 10, a hair color options graphical display 1000 can be displayed on a user interactive display (for example, a touchscreen) of a kiosk such the display 205 of the kiosk 200 and/or an input device (for example, a touchscreen) of a computing system such as input device(s) 1114 of computing system 1100. The display 1000 can include plurality of available hair dye colors 1010. The graphical display 1000 also includes a plurality of photographs 1020 of a customer seeking to have their hair dyed a different color. In FIG. 11, the plurality of photographs 1020 comprises four of the same photograph. The plurality of photographs can have any suitable viewable number of photographs such as, for example, from 2 to 10 of the same photograph.

The user and/or customer can select a hair dye color displayed in the plurality of hair dye colors 1010 for each of the plurality of photographs 1020 by first selecting a hair dye color and then specifying one of the plurality of photographs 1020 to correspond to the selected hair dye color. As hair dye colors and photographs are correlated to each other, anticipated images of the customer after a hair treatments using the specified hair dye colors is obtained. The anticipated images can further be viewed as would be seen in person or in a photograph while in the presence of a light source such a bulb lamp, a fluorescent lamp, or day light by clicking a bulb lamp button 1030, a fluorescent lamp button 1040, or a day light button 1050, respectively. Additionally, after the customer has decided to proceed with a selected hair dye color treatment, guidance or instructions, such as for the application of hair dye, application of heat, curling, ironing, etc. can be generated by the computing system and displayed on an output device as described above. In some instances, the user output device, such as a smartphone or tablet, can be the same as the user input device.

FIG. 11 illustrates an exemplary graphical display for the selection of hair style options in accordance with various aspects of the present disclosure. In FIG. 11, a hair style options graphical display 1200 can be displayed on a user interactive display (for example, a touchscreen) of a kiosk such the display 205 of the kiosk 200 and/or an input device (for example, a touchscreen) of a computing system such as input device(s) 1114 of computing system 1100. The display 1200 can include plurality of sample hair styles 1210. Each of the plurality of hair styles 1210 can have the same hair color or can be a different hair color. In some instances, one or more of the plurality of hair styles 1210 can be directed to specific hair styles having varied hair colors such as, for example, highlights, lowlights, dyed tips, frosted tips, ombre, sombre, balayage, colormelt, and flamboyage.

The hair style options graphical display 1200 further includes a photograph 1220 of the customer. The user and/or customer can select a hair style displayed in the plurality of hair styles 1210. The selected hair style is then appropriately overlaid onto the photograph 1220 of the customer to provide an anticipated image of the customer after a hair treatment, in accordance with the selected hair style, has been performed. Additionally, after the customer has decided to proceed with a selected hair style and/or coloring treatment, guidance or instructions, such as for the application of hair dye, application of heat, curling, ironing, etc. can be generated by the computing system and displayed on an output device as described above. In some instances, the user output device, such as a smartphone or tablet, can be the same as the user input device.

Figure 12:
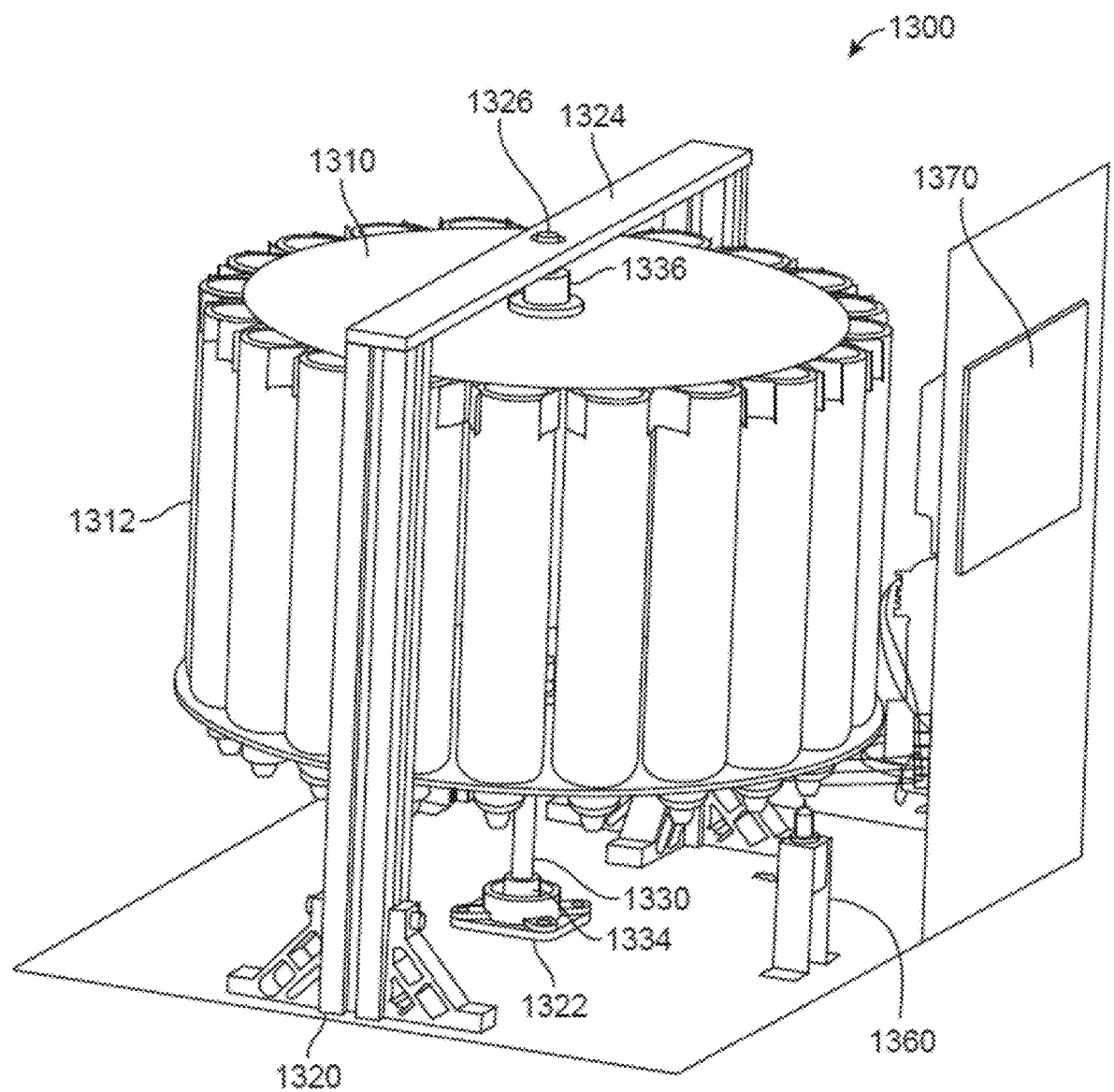
FIG. 12 is a perspective view of an exemplary dispensing system for use in the hair dye machine of FIG. 1 or FIG. 2.
Figure 13:
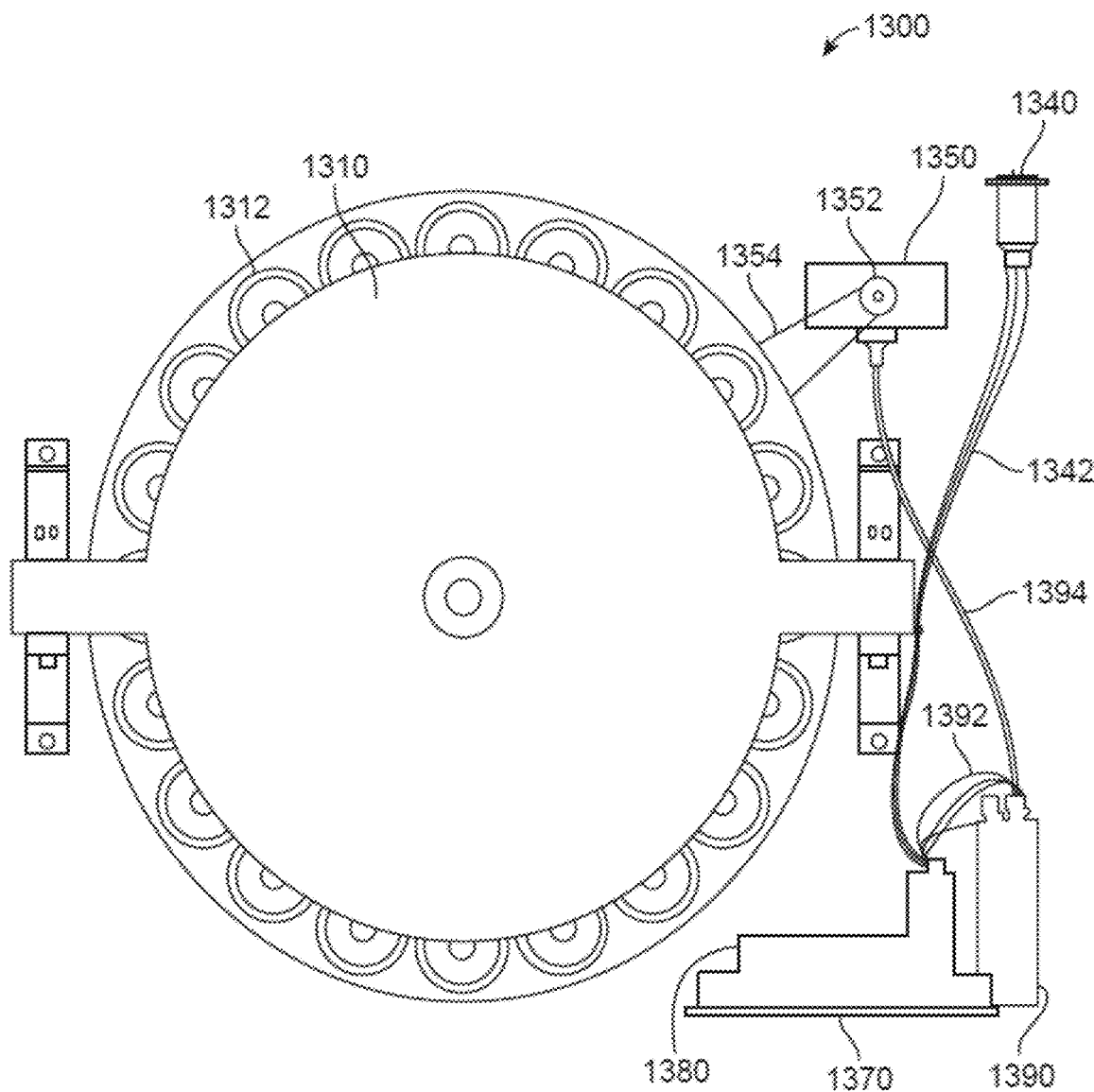
FIG. 13 is a top side view of the dispensing system of FIG. 12.
Figure 14:
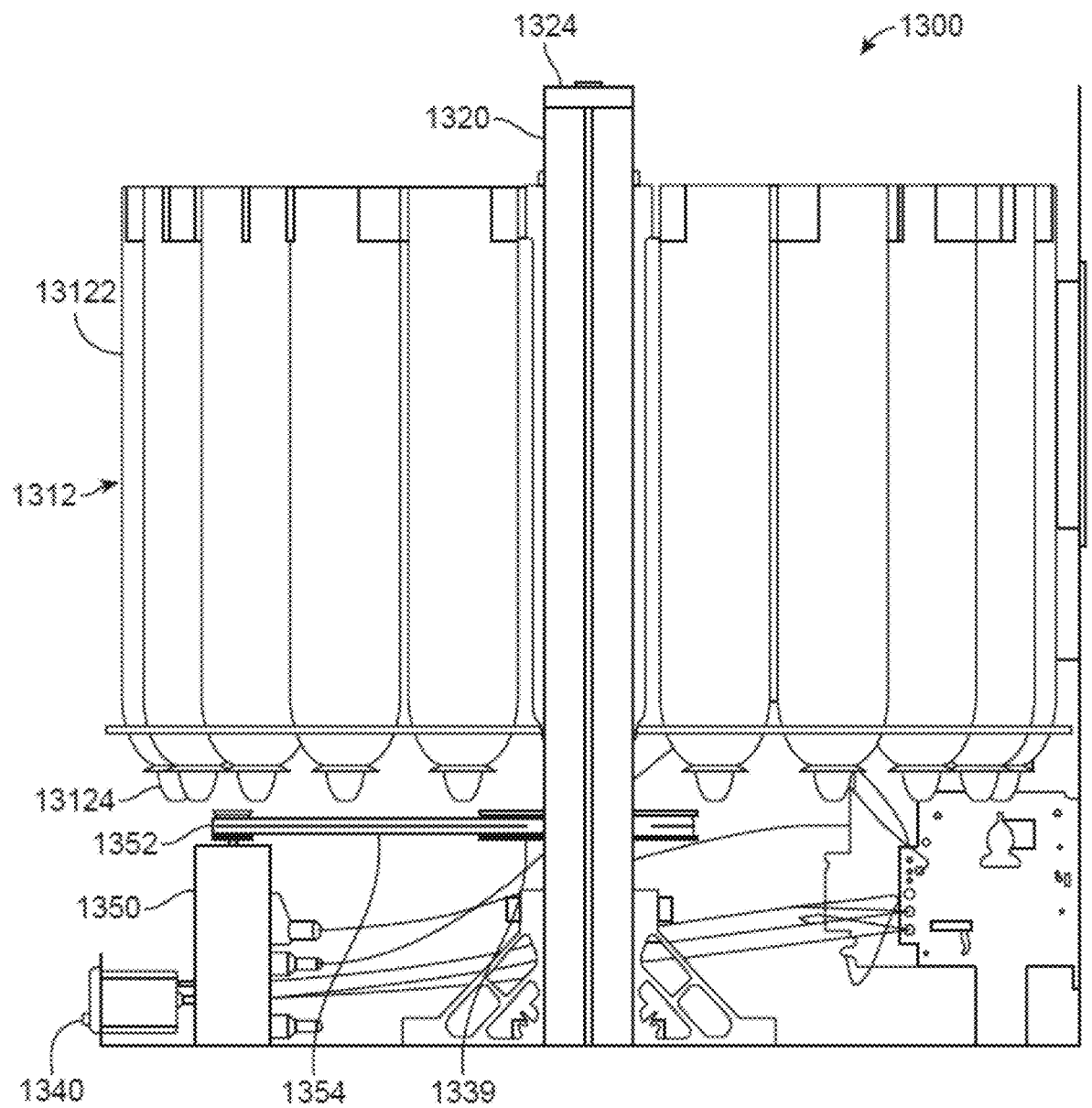
FIG. 14 is a left side view of the dispensing system of FIG. 12.
Figure 15:
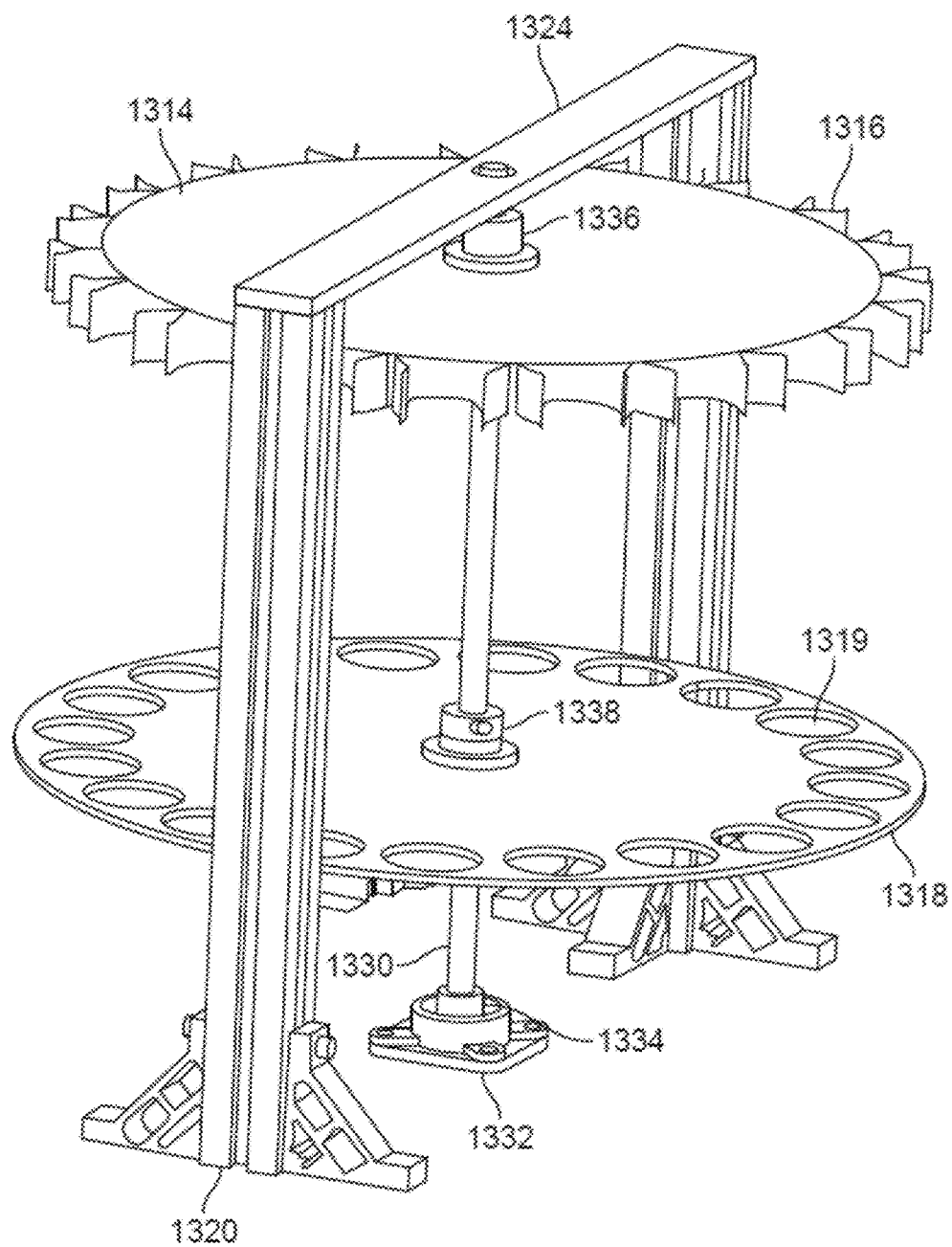
FIG. 15 is a perspective view of a rotary dye storage containers holder assembly of the dispensing system of FIG. 12.

FIGS. 12-15 illustrate an exemplary dispensing system 1300 for use in the hair dye machine of FIG. 1 or FIG. 2. Specifically, the dispensing system 1300 can be used instead of the plurality of storage containers 110 as shown in FIG. 1. FIG. 12 is a perspective view of the exemplary dispensing system 1300. FIG. 13 is a top side view of the dispensing system 1300. FIG. 14 is a left side view of the dispensing system 1300. FIG. 15 is a perspective view of a rotary dye storage containers holder assembly of the dispensing system 1300. The dispensing system 1300 includes a rotary storage containers holder assembly 1310, a holder assembly support structure 1320, a rotary shaft assembly 1330, an index motor 1350 and a linear motor 1360. The rotary storage containers holder assembly 1310 is configured to hold plurality of storage containers 1312. Each of the storage containers 1312 can hold one or more specific dye ingredients. Each of the plurality of storage containers 1312 includes a rigid main body 13122 for storage of the one or more specific dye ingredients and a valve 13124 for the transmission of the one or more specific dye ingredients therefrom. In some instances, some or all of the plurality of storage containers 1312 can be bag-on-valve type bottles. In some instances, some or all of the plurality of storage containers 1312 contain a pressurized dye ingredient.

Dye ingredients may include at least one colorant, one or more activators, such as peroxides or other oxidizers, one or more bases, and/or one or more additives, such as a viscosity regulating agent. For example, dye ingredients may include three colorants, each colorant being a different primary color. Various amounts of the primary color colorants may be mixed according to hair dye formulas to produce different hair dye colors. Examples of suitable dye ingredients may include conventionally used additives, including but not limited to antioxidants such as ascorbic acid, erythoboric acid or sodium sulfite to inhibit premature oxidizing, oxidizing agents, fragrances and/or perfume oils, chelating agents, emulsifiers, coloring agents, thickeners (e.g., fatty acid soaps such as alkaline metal salts or alkanolamine salts of fatty acids, oleic acid, myristic acid and lauric acid), organic solvents, opacifying agents, dispersing agents, sequestering agents, humectants, antimicrobials, solvents such as ethanol, isopropanol, polyhydroxy alcohols (e.g., propylene glycol and hexylene glycol), lower alkyl ethers (e.g., ethoxy diglycol), and others known in the art.

The rotary storage containers holder assembly 1310 includes a circular top plate 1314 with a plurality of gripping elements 1316 extending radially therefrom. In FIG. 15, the each of the gripping elements 1316 is a flexible U-bracket. In other instances, each of the gripping elements can be circular mounting brackets having an internal diameter the same or slightly larger than the outer diameter of the storage container 1312. In other instances, each of the gripping elements 1316 can any component known to one of ordinary skill in the art which is suitable to hold a storage container 1312 and allow for insertion/removal of the bottle therefrom. The rotary storage containers holder assembly 1310 also includes a circular lower plate 1318 having a plurality of apertures 1319, each aperture 1319 configured allow at least a portion of a storage container 1312 to extend therethrough. Each of the plurality of gripping elements 1316 will have a corresponding aperture 1319 for the retention of a single storage container 1312.

The holder assembly support structure 1320 includes two vertical support beams 1322, immobilized on a base within the hair dye machine of FIG. 1 or FIG. 2, and a horizontal cross beam 1324 connected to each of the vertical support beams 1322. A portion of the rotary shaft assembly 1330 extends into an aperture 1326 of the horizontal cross beam 1324 and is allowed to freely rotate therein.

The rotary shaft assembly 1330 includes a shaft 1331, a base mount 1332 to immobilize the rotary shaft assembly 1330 on a base within the hair dye machine of FIG. 1 or FIG. 2, and a freely rotatable bearing 1134 set in a groove (not shown) of the base mount 1332 and coupled to an end of the shaft. The circular top plate 1314 is securely coupled with the shaft 1331 via a top nut and washer 1336 and a bottom nut and washer (not shown). The circular lower plate 1318 is securely coupled with the shaft 1331 via a top nut and washer 1338 and a bottom nut and washer (not shown).

The index motor 1350 controls the position of the rotary bottle holder assembly 1310 relative to the linear motor 1360 by rotation of belt wheels 1339, 1352 and belt 1354. The linear motor 1360 can actuate a valve 13124 of a storage container 1312 and control the rate and/or quantity of dye ingredient discharge therefrom. The linear motor 1360 also fluidically coupled the storage containers 1312 to a pumping device or receptacle, such as the pumping device 130 or the receptacle 120, via a flow passage, such as the flow passage 112.

Portions of the hair dye machine of FIG. 1 or FIG. 2 and the dispensing system 1300 are provided power from an alternating current (AC) or direct current (DC) power source (not shown) via a power plug 1340. The power plug 1340 is electrically coupled with a computing system 1380 (which may be the same as computing system 1100) via wires 1342. The computing system 1380 provides outputs to a display 1370 (which may be the same as display 105 or display 205 of kiosk 200). The computing system 1380 is also communicatively coupled with a control system 1390 via wires 1392. The control system 1390 is in turn also communicatively coupled with the index motor 1350 via wires 1394 and also communicatively coupled with the linear motor 1360 via wires (not shown). The control system 1390 controls actuation of the index motor 1350 and linear motor 1360 based on instructions provided by the computing system 1380.

STATEMENTS OF THE DISCLOSURE

Statements of the Disclosure include:

Statement 1: An apparatus for producing a hair dye, comprising a housing; a hair dye dispensing system disposed in the housing, the dispensing system comprising at least one storage container containing a hair colorant, a pump operatively connected to the at least one storage container, and a mixing chamber; a spectral measurement device; and a computing system comprising control mechanism operatively connected to the pump and the spectral measurement device, a processor, a storage device, an input, and a display.

Statement 2: An apparatus according to Statement 1, wherein the spectral measurement device is any one of a spectroscope and a spectrophotometer.

Statement 3: An apparatus according to Statement 1 or 2, wherein the dispensing system comprises a rotary storage container holder assembly.

Statement 4: An apparatus according to any one of Statements 1-3, wherein the pump is connected to a flow passage extending between the at least one storage container and the mixing chamber.

Statement 5: An apparatus according to any one of Statements 1-4, wherein the at least one storage container comprises an airtight bag.

Statement 6: An apparatus according to any one of Statements 1-5, further comprising at least one storage container containing a hair dye ingredient, wherein the hair dye ingredient is any one of an activator, a base, an acid, a viscosity regulating agent, an antioxidant, a fragrance, an oil, an oxidizing agent, a chelating agent, an emulsifier, a thickener, a solvent, an opacifying agent, a dispersing agent, a sequestering agent, a humectant, an antimicrobial, and a conditioner.

Statement 7: An apparatus according to any one of Statements 1-6, wherein the dispensing system further comprises a dispensing sensor disposed in the at least one storage container, the dispensing sensor operatively connected to the control mechanism.

Statement 8: An apparatus according to any one of Statements 1-7, wherein the storage device comprises at least one stored profile, the stored profile comprising historical hair data for a user and at least one historical hair dye formula for the user.

Statement 9: An apparatus according to any one of Statements 1-8, wherein the storage device comprises at least one stored profile, the stored profile comprising historical hair data for a population of users.

Statement 10: An apparatus according to Statement 9, wherein the each of the population of users exhibit a similar hair property, a similar geographic location, a similar historical hair dye treatment, a similar age group, or any combination thereof.

Statement 11: A method for producing a hair dye formula, comprising collecting hair data from a hair sample of an individual, the hair data comprising one or more of chemical composition, moisture content, porosity, and density; selecting a hair color; generating a formula for a hair dye based on the collected hair data and the selected hair color, the formula comprising amounts of dye ingredients; and dispensing the amounts of the dye ingredients to produce the hair dye, wherein the hair dye ingredients comprise at least one colorant and at least one other ingredient.

Statement 12: A method according to Statement 11, further comprising executing computer readable program code by a processor in a control mechanism to provide the formula, wherein the computer readable program code is stored in a storage device.

Statement 13: A method according to Statement 11 or 12, further comprising comparing the hair data and selected hair color of the individual to hair data of at least one population of individuals which have previously selected the hair color.

Statement 14: A method according to any one of Statements 11-13, wherein dispensing comprises pumping dye ingredients from at least one storage container into a mixing chamber using at least one pump; and sensing the amount of dye ingredients pumped from the at least one storage container with at least one dispensing sensor disposed in the at least one storage container; wherein a control mechanism receives signals from the at least one dispensing sensor and sends signals to the at least one pump.

Statement 15: A method according to any one of Statements 11-14, wherein the hair data is collected with a spectral measurement device.

Statement 16: A method according to any one of Statements 11-15, wherein the hair color is selected from a display on a hair dye dispensing apparatus, and wherein amounts of dye ingredients are dispensed from the hair dye dispensing apparatus to form a hair dye corresponding to the selected hair dye color.

Statement 17: A method according to any one of Statements 11-16, wherein at least one other ingredient is any one of an activator, a base, an acid, a viscosity regulating agent, an antioxidant, a fragrance, an oil, an oxidizing agent, a chelating agent, an emulsifier, a thickener, a solvent, an opacifying agent, a dispersing agent, a sequestering agent, a humectant, an antimicrobial, and a conditioner.

Statement 18: A method according to any one of Statements 11-17 performed using an apparatus according to any one of Statements 1-10.

Statement 19: A method, comprising collecting hair data from a hair sample of an individual using a spectral measurement device; selecting a hair color; and providing a hair dye for making the hair sample to exhibit the selected hair color.

Statement 20: A method according to Statement 19, wherein providing the hair dye comprises generating a formula for the hair dye based on the collected hair data and the selected hair color, the formula comprising amounts of dye ingredients; and mixing amounts of dye ingredients based on the generated formula to make the hair dye, wherein the hair dye ingredients comprise at least one colorant and at least one other ingredient.

Statement 21: A method according to Statement 19 or 20, further comprising comparing the hair data and selected hair color of the individual to hair data of at least one population of individuals which have previously selected the hair color.

Statement 22: A method according to any one of Statements 19-21 performed using an apparatus according to any one of Statements 1-10.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. An apparatus for producing a hair dye, comprising:
   a housing;
   a display at least partially disposed in the housing and viewable externally from the housing;
   a rotary storage container holder assembly disposed in the housing and configured to hold storage containers, each storage container of the storage containers that the rotary storage container holder assembly is configured to hold comprises a valve configured to selectively discharge a hair dye ingredient from the storage container;
   a holder support assembly comprising two support beams, a crossbeam, and a rotary shaft, wherein the crossbeam is connected to each of the support beams, the crossbeam is rotatably connected to the rotary shaft, and the rotary shaft rotatably supports the rotary storage container holder assembly within the housing;
      a linear motor disposed in the housing and configured to contact the valves of the storage containers to control discharge of the hair dye ingredient from the storage containers;
   an index motor disposed in the housing and configured to control a position of the rotary storage container holder assembly relative to the linear motor;
   a receptacle configured to receive hair dye ingredients from the storage containers; and
   a computer configured to actuate the index motor and the linear motor to control dispensing of the hair dye ingredients from the storage containers into the receptacle to produce the hair dye.

2. The apparatus of claim 1, wherein the rotary storage container holder assembly further comprises:
   a circular top plate comprising grippers that extend radially; and
   a circular lower plate comprising apertures,
   wherein the grippers and apertures are configured to retain the storage containers with portions of the storage containers extending through the apertures.

3. The apparatus of claim 1, further comprising the storage containers.

4. The apparatus of claim 3, wherein at least one of the storage containers comprise a bag-on-valve bottle.

5. The apparatus of claim 3, wherein each of the storage containers contain a respective pressurized dye ingredient.

6. The apparatus of claim 3, wherein at least one of the containers contains a colorant.

7. The apparatus of claim 3, wherein at least one of the storage containers contains at least one of an activator, a base, an acid, a viscosity regulating agent, an antioxidant, a fragrance, an oil, an oxidizing agent, a chelating agent, an emulsifier, a thickener, a solvent, an opacifying agent, a dispersing agent, a sequestering agent, a humectant, an antimicrobial, or a conditioner.

8. The apparatus of claim 1, wherein the computer comprises a storage device that comprises at least one stored profile, the stored profile comprising historical hair data for a user and at least one historical hair dye formula for the user.

9. The apparatus of claim 1, wherein the computer comprises a storage device that comprises at least one stored profile, the stored profile comprising historical hair data for a population of users.

10. The apparatus of claim 9, wherein each user of the population of users exhibit at least one of a similar hair property, a similar geographic location, a similar historical hair dye treatment, or a similar age group.

11. The apparatus of claim 1, wherein the display is a user interactive display.

12. The apparatus of claim 1, further comprising an input device communicatively coupled with the computer.

13. The apparatus of claim 1, further comprising a spectral measurement device operatively connected to the computer.

14. The apparatus of claim 13, wherein the spectral measurement device comprises one of a spectroscope or a spectrophotometer.

15. The apparatus of claim 1, further comprising a weigh scale configured to weigh the receptacle and contents therein.

16. The apparatus of claim 15, wherein the weigh scale is configured to send weight measurements to computer.

17. The apparatus of claim 1, wherein the computer is configured to communicate with a network.

18. The apparatus of claim 1, wherein the computer is configured to communicate with an external input device.

19. The apparatus of claim 1, further comprising:
   a flow passage that is configured to connect the storage containers to the receptacle; and
   a pump configured to the pump the hair dye ingredients through the flow passage from the storage containers to the receptacle,
   wherein the linear motor is configured to fluidly connect the storage containers to the receptacle via the flow passage by actuating the valves of the storage containers.

20. The apparatus of claim 1, wherein the linear motor is mounted to a bottom of the housing such that an entirety of the linear motor is disposed below the rotary storage container holder assembly.

* * * * *